United States Patent
Kuwahara

[11] Patent Number: 6,137,204
[45] Date of Patent: Oct. 24, 2000

[54] VR-TYPE RESOLVER

[75] Inventor: Masaki Kuwahara, Gunma, Japan

[73] Assignee: NSK Ltd., Tokyo, Japan

[21] Appl. No.: 09/317,223

[22] Filed: May 24, 1999

[30] Foreign Application Priority Data

| May 22, 1998 | [JP] | Japan | 10-141327 |
| Jun. 30, 1998 | [JP] | Japan | 10-184453 |
| Apr. 22, 1999 | [JP] | Japan | 11-114810 |

[51] Int. Cl.$^7$ ............................................. H02K 1/12
[52] U.S. Cl. .......................... 310/254; 310/162; 310/168; 310/179; 310/166; 310/68 B; 310/218; 318/661; 340/347 SY
[58] Field of Search ...................... 310/254, 168, 310/162, 179, 185, 166, 68 B, 218; 318/661; 340/347 SY

[56] References Cited

U.S. PATENT DOCUMENTS

| 4,461,994 | 7/1984 | MacDonald | 324/174 |
| 4,551,708 | 11/1985 | Welburn | 340/347 |
| 4,568,865 | 2/1986 | Welburn | 318/661 |
| 4,675,564 | 6/1987 | Isozaki | 310/49 R |
| 4,733,117 | 3/1988 | Perrins | 310/162 |
| 4,794,286 | 12/1988 | Taenzer | 310/12 |
| 4,794,511 | 12/1988 | Lundin | 363/156 |
| 4,870,358 | 9/1989 | Glaize et al. | 324/208 |
| 4,940,937 | 7/1990 | Hattori et al. | 324/207.22 |
| 4,980,594 | 12/1990 | Poro | 310/168 |
| 5,250,889 | 10/1993 | Ezuka | 318/661 |
| 5,866,962 | 2/1999 | Kim | 310/68 B |

FOREIGN PATENT DOCUMENTS

| 3-150041 | 6/1991 | Japan | H02K 5/12 |
| 7-44813 | 2/1995 | Japan | G11B 5/187 |

*Primary Examiner*—Clayton LaBalle
*Assistant Examiner*—Thanh Lam
*Attorney, Agent, or Firm*—Sughrue, Mion, Zinn, Macpeak & Seas, PLLC

[57] ABSTRACT

In a VR-type resolver which is used in combination with a motor to detect the rotation position of the motor, the teeth number of a rotor of the resolver is reduced over the teeth number of a rotor of the motor. Also, the shape of the teeth of the resolver rotor is simplified into a curved shape such as a sine wave shape. Further, in another type of VR-type resolver, the number of the magnetic poles of the stator with respect to the number of the teeth of the rotor is set as a number being capable of satisfying not only the condition that it is a multiple of the phase number N and an even number but also the condition that it is a number which can be calculated according to one of the following expressions (1) and (2), that is, stator pole number=rotor teeth number/$(M+1/N)$     (1)

stator pole number=rotor teeth number/$\{M+(N-1)/N\}$   (2), where M is an integral number of one of 1, 2, and 3.

5 Claims, 24 Drawing Sheets

ENCODER = 76920

WHOLE PERIPHERY ACCURACY [SEC.]
 MAXIMUM VALUE 17.26
 MINIMUM VALUE −11.21
 ACCURACY 28.47

(ACCURACY 2.70 [PULSE])
(R.D.C 12 BIT)
(DOTTED LINE ± 150.00 [SEC.])

ENCODER = 2860

WHOLE PERIPHERY ACCURACY [SEC.]
 MAXIMUM VALUE 23.17
 MINIMUM VALUE −31.43
 ACCURACY 54.60

(ACCURACY 20.71 [PULSE])
(R.D.C 12 BIT)
(DOTTED LINE ± 12.50 [SEC.])

ENCODER = 90045

WHOLE PERIPHERY ACCURACY [SEC.]
MAXIMUM VALUE 29.48
MINIMUM VALUE −33.87
ACCURACY 63.34

(ACCURACY 5.00 [PULSE])
(R.D.C 12 BIT)
(DOTTED LINE ± 150.00 [SEC.])

ENCODER = 68099

WHOLE PERIPHERY ACCURACY [SEC.]
MAXIMUM VALUE 63.69
MINIMUM VALUE −62.31
ACCURACY 126.00

(ACCURACY 39.82 [PULSE])
(R.D.C 12 BIT)
(DOTTED LINE ± 120.00 [SEC.])

VR-TYPE RESOLVER

BACKGROUND OF THE INVENTION

1. Field of the Invention

The present invention relates to a VR-type (variable reluctance type) resolver which is mounted on a motor to detect the angular position and rotational speed of the motor and, in more particular, to such VR-type resolver in which the number of teeth formed on a rotor or the number of the stator pole is adjusted to thereby improve the angular accuracy thereof.

The present application is based on Japanese Patent Applications No. Hei. 10-141327, 10-184453 and 11-114810, which are incorporated herein by reference.

2. Description of the Related Art

A VR-type resolver is a device which is structured such that reluctance in an air gap between the iron core of a rotor thereof and the magnetic pole of a stator thereof is caused to vary depending on the position of the rotor and, each time the rotor iron core is rotated, the fundamental wave component of variations in the reluctance provides an N cycle, whereby the variations in the reluctance can be detected and thus the rotational angular position or rotating speed of a motor can be detected by the thus detected reluctance variations. The VR-type resolver has a wide range of uses; for example, it can be used as rotation detect means which feedback controls the rotation angle of a stepping motor with a closed loop to thereby allow the stepping motor to be positioned with high accuracy, while the stepping motor is often used as a direct drive motor (DD motor) in various machines and instruments, including rotational drive units such as a robot, a delivery machine and the like, index tables for use in an automatic assembling machine, a measuring instrument and the like, working indexes for use in an NC machine tool, an exclusively designed machine and the like. Here, FIG. 21 shows a conventional VR-type resolver when it is used in a DD motor, which is disclosed in Japanese Patent Publication No. Hei. 3-150041. The DD motor shown in FIG. 21, which is a VR-type stepping motor M, is structured such that, outside a stator 2 which is composed of an electromagnet fixed to a motor casing 1, there is disposed a rotor 3 composed of an iron core including a large number of teeth formed on and projected from the inner periphery thereof in such a manner that the rotor 3 is opposed to the stator 2. On the rotor 3 of the stepping motor M, there is fixedly mounted, together with a motor output shaft 4 (which is rotatably supported by the motor casing 1 through bearings 5 and 6), a rotor 7 of a resolver R serving as a rotation detector in such a manner that the resolver rotor 7 can be rotated synchronously with the motor rotor 3. On the other hand, a stator 8 of the resolver R is disposed opposed to the rotor 7 (the rotor shown in FIG. 21 is a rotor of an outer type which includes teeth on the inner peripheral surface of the rotor) of the resolver 8 with an air gap between them, while the stator 8 is fixedly mounted on the motor casing 1.

In the above-mentioned conventional resolver R, the magnetic poles of the stator 8 of the resolver R respectively include similar pole teeth to those of the stator 2 of the motor M, while the coils CL of the resolver R are wound around their respective magnetic poles of the stator 8. Also, the rotor 7 of the resolver R includes a large number of teeth which are provided on and projected from the inner peripheral surface thereof, while the number of teeth of the rotor 7 may be set variously, such as, 100, 120, 160 and the like; in any case, the teeth number of the rotor 7 is set equal to the teeth number (pitch) of the rotor 3 of the motor M.

By the way, the DD motor shown in FIG. 21 is a closed type actuator which can be used in the ultra-high vacuum atmosphere. In particular, in the shown DD motor, in order to be able to prevent the vacuum atmosphere from being contaminated by gas released from the coils CL of the stator 2 of the motor M and the stator 8 of the resolver R, in an air gap which exists not only between the motor stator 2 and motor rotor 3 but also between the resolver rotor 7 and resolver stator 8, there is disposed a separation wall 9 formed of non-magnetic metal such as stainless steel or the like; that is, the stator side is covered airtight by the separation wall 9 and is there by isolated from the rotor side. In other words, if a VR resolver is mounted on the thus structured DD motor and the detect signal of the VR resolver is fed back, then the rotational speed and rotational angle (position) of the actuator can be controlled with accuracy.

However, in the above-mentioned conventional VR type resolver, because the number of the rotor teeth is set large such as 100, 120, 160 and the like in order to be able to obtain a high resolving power, and also because the teeth peak shape of the lamination of the resolver is square similarly to that of the lamination of the VR motor, working of the resolver required becomes severer as the diameter of the resolver becomes smaller, which not only makes it easy to produce a teeth pitch error but also makes it difficult to control the air gap in assembling. Accumulated teeth pitch errors worsen the whole periphery accumulation accuracy of the motor rotation position detection, while the uneven air gap gives rise to increases in the stationary angle error, vibration, and noise of the resolver.

Also, when the resolver is mounted on the DD motor, since a motor control device gives a rotation instruction while it is always reading a position detect signal fed back from the resolver to thereby confirm the current position of the motor rotor, if the detected position of the motor rotor by the resolver has an error, then the current position of the motor rotor is different from the rotation instruction by the motor control device, which gives rise to generation of vibrations in the resolver. In this case, as the teeth number of the resolver rotor is larger, a vibration frequency generated becomes higher and thus larger vibrations can be generated. For example, when a motor having the teeth number of 120 is rotating at a rate of 1 rps, if the rotor teeth number of a resolver mounted on the present motor is also 120, that is, equal to the rotor teeth number of the motor, then there is generated a vibration frequency of 120 Hz/rps.

In a DD motor such as the above-mentioned DD motor for vacuum (closed type actuator) in which the separation wall is disposed in the air gap between the respective stators and rotors of the motor and resolver, since the conventional air gap is very small, the thickness of the partition wall must be set very small, which incurs a possibility that the partition wall can be expanded when the motor is used under the ultra-high vacuum condition. Therefore, in the conventional resolver, there is room for improvement.

Further, as another type of position detector, for example, there is known a VR-type synchronous resolver which is disclosed in Japanese Patent Publication No. Hei. 7-44813. The VR-type synchronous resolver, as shown in FIG. 22, is a resolver of an inner rotor type which includes an annular-shaped stator 10 and an annular-shaped rotor 20 in such a manner that the rotor 20 is combined with the inside of the stator 10; and, the stator 10 includes a plurality of (for example, 18) magnetic poles 12 which are formed on the inner peripheral surface thereof and arranged at regular intervals in the circumferential direction of the stator 10 and respectively have a plurality of pole teeth 11 in their respective leading end portions with coils 13 wound around the respective magnetic poles 12, while the stator 10 is fixedly supported. The rotor 20 includes a large number of teeth 21 (for example, 150 teeth) which are formed on the outer peripheral surface thereof and arranged in the circumferential direction of the rotor 20 at the same pitch as the pole teeth 11 of the stator 10 in such a manner that they are opposed to the magnetic poles 12, while the rotor 20 is disposed concentrically with the stator 10 and is so supported as to be rotatable with respect to the stator 10. And, the coil windings 13 wound around the respective magnetic poles 12 of the stator 10, as shown in FIG. 23, are respectively connected to the A phase, B phase and C phase of a 3-phase alternating current in which the three phases are shifted electrically by 120° from one another, so that they are allowed to correspond to the phases of the coils of the motor. In order that the phases of the two electrically mutually adjoining magnetic poles 12, 12 of the resolver stator 10 can have an electric angle of 120° with respect to each other, the pole teeth 11 of the resolver stator 10 are respectively shifted from one another at a pitch in the range of integer times to ⅓ of the pitch of the teeth 21 of the resolver rotor 20.

Now, assuming that the resolver rotor 20 rotates synchronously with a motor rotor (not shown), reluctance in an air gap between the teeth 21 of the resolver rotor 20 and the magnetic poles 12 of the resolver stator 10 varies depending on the change of the position of the resolver rotor 20, and a current depending on the variations in the reluctance is thereby allowed to flow in the coil windings 13 of the resolver stator 10. By detecting the current as a modulation signal, the rotational angle position or rotational speed of the resolver rotor 20 can be detected. If the resolver rotor 20 rotates by an amount equivalent to one tooth thereof, then there is detected on the resolver stator 10 side the following modulation signal which is equivalent to an electric angle of 360°:

$$A \text{ phase} = a \cdot \sin(\theta)\sin(wt)$$

$$B \text{ phase} = a \cdot \sin(\theta - 120)\sin(wt)$$

$$C \text{ phase} = a \cdot \sin(\theta - 240)\sin(wt)$$

For example, when the teeth number of the resolver rotor 20 is 150, if the resolver rotor 20 rotates once, a signal having the above-mentioned phases A, B and C is obtained at a cycle of 150. The thus obtained 3-phase signal is phase converted by an electric circuit to a cos signal and a sin signal, the thus converted cos and sin signals are input into an RDC (resolver digital converter) and converted to a position signal, and the thus converted position signal is fed back to the DD motor, thereby being able to control the rotational speed and rotational angle (position) of the DD motor with accuracy.

In the thus structured conventional VR-type resolver, because the teeth number of the rotor is set as a large number such as 120, 150, 160 or the like in order to obtain a high resolving power, and also because the teeth top portion of the lamination of the resolver is formed in a square shape which is similar to the shape of the VR motor lamination, the smaller the diameter of the resolver is, the severer the working accuracy of the resolver is, so that a teeth pitch error and the like are easy to occur. Accumulation of the teeth pitch errors worsens the whole periphery accumulation accuracy of the rotation position detection, which gives rise to the error of the stationary angle of the resolver.

By the way, a test was conducted on the conventional VR-type resolver in which the teeth number of the resolver rotor 20 is 150 and the number of the magnetic poles 12 (which is hereinafter referred to as the pole number simply) is 18. In this test, the whole periphery (absolute) accuracy in one rotation of the rotor was measured using a rotary encoder and the measured data were recorded by an X-Y plotter. FIG. 24 shows the thus obtained whole periphery accuracy of the conventional VR-type resolver. The accuracy was 31.66 sec., that is, about 32 sec. As means for enhancing this accuracy further, it can be imagined that the pole number of the magnetic poles of the resolver stator arranged at regular intervals in the circumference thereof is increased. This ought to disperse and reduce influences by the teeth pitch errors of the resolver rotor, thereby being able to enchance the whole periphery accuracy further. Accordingly, with the two following conditions taken into account, let us check whether it is possible or not to increase the pole number (18 poles) of the resolver stator in the above-mentioned VR-type resolver.

(1) The pole number of a stator forming a 3-phase resolver must be a multiple of 3 and an even number. The reason why the pole number must be an even number is that the coils are wound in alternate directions around the respective magnetic poles of the stator, in particular, Cw (clockwise), CCW (counterclockwise), CW, CCW, - - - .

(2) The phases of the mutually adjoining magnetic poles of the resolver stator must be ±120° (±⅓ pitch).

When the teeth number of the resolver rotor is 150, the relation between the pole number (which is greater than or equal to 18) of the resolver stator and phase difference, which can satisfy the present condition, is shown in Table 1.

TABLE 1

| 18 | 24 | 30 | 36 | 42 | 48 | 54 | 60 | 66 | 72 | 78 | 84 | 90 |
|---|---|---|---|---|---|---|---|---|---|---|---|---|
| 120 | 90 | 0 | 60 | 206 | 45 | 280 | 180 | 98.2 | 30 | 332 | 283 | 240 |

Upper : Stator pole number
Lower : Phase difference

As can be seen clearly from Table 1, the stator pole numbers that can be set by the 3-phase resolver are only 18 and 90. However, if 90 magnetic poles are provided, then the width of the magnetic poles of the resolver stator is almost the same as the teeth width of the resolver rotor (the teeth width of 150 teeth is 0.787), with the result that the strength of the resolver stator is lowered excessively and thus the resolver stator can be damaged when it is manufactured. Therefore, it is difficult to realize the 90 magnetic poles. That is, in order to enhance further the detect accuracy of the VR-type resolver, it is desirable to increase the pole number of the resolver stator but, in fact, such increase in the pole number is limited by the teeth number of the resolver rotor, which makes it difficult to stabilize the high detect accuracy.

SUMMARY OF THE INVENTION

The present invention aims at solving the unsolved problems relating to the further enhanced accuracy in the conventional VR-type resolver. Accordingly, it is an object of the invention to provide a high-accuracy N-phase VR-type resolver which can be manufactured easily by selecting the pole number of a stator thereof with respect to the teeth number of a rotor thereof.

Further, it is another object of the invention to provide a VR type resolver which can provide high accuracy and low vibrations, can be easily made compact, and is also suitable for application to ultra-high vacuum specifications.

In attaining the above object, according to the invention, there is provided a high-accuracy VR-type resolver, comprising: an annular-shaped stator fixedly supported, the stator including a plurality of magnetic poles formed at regular intervals on the circumference thereof, each of the magnetic poles having a plurality of pole teeth in their respective leading end portions, the magnetic poles having N phases of coils respectively wound phase by phase in series therearound; and, an annular-shaped rotor disposed concentrically with the stator and rotatable with respect to the stator, the rotor including teeth respectively formed in the circumferential direction thereof in such a manner that they are opposed to the pole teeth of the stator, wherein the number of the magnetic poles of the stator with respect to the number of the teeth of the rotor is set as a number being capable of satisfying not only the condition that it is a multiple of the phase number N and an even number but also the condition that it is a number which can be calculated according to one of the following expressions (1) and (2):

stator pole number=rotor teeth number/$(M+1/N)$    (1)

stator pole number=rotor teeth number/$\{M+(N-1)/N\}$    (2), where M is an integral number of one of 1, 2, and 3.

Further, according to the invention, there is provided another type of VR-type resolver which is used in combination with a motor to detect the rotation position of the motor, wherein the number of teeth formed on a rotor provided in the resolver is set smaller than the number of teeth formed on a rotor provided in the motor.

Also, the teeth of the rotor of the resolver can be shaped in a curved shape such as a sine wave shape, instead of a square shape which is employed in a conventional resolver.

Features and advantages of the invention will be evident from the following detailed description of the preferred embodiments described in conjunction with the attached drawings.

BRIEF DESCRIPTION OF THE DRAWINGS

In the accompanying drawings:

FIG. 14A shows a magnetic pole having two pole teeth according to the invention, and FIG. 14B shows an ordinary or conventional magnetic pole having a large number of pole teeth;

FIG. 15A is a partially omitted plan view of a rotor employed in the third embodiment, and FIG. 15B is a partially enlarged view of the teeth shape of the present rotor;

FIG. 17A is a graphical representation of the results of the whole periphery measurement accuracy of a resolver including 30 teeth according to the invention, and FIG. 17B is a graphical representation of the results of the whole periphery measurement accuracy of a conventional resolver including 120 teeth;

FIG. 18A is a plan view of a rotor employed in the fourth embodiment, and FIG. 18B is a partially enlarged view of the teeth shape of the present rotor;

FIG. 20A is a graphical representation of the results of the whole periphery measurement accuracy of a resolver including 25 rotor teeth according to the fourth embodiment of the invention, and FIG. 20B is a graphical representation of the results of the whole periphery measurement accuracy of a conventional resolver including 100 teeth;

DETAILED DESCRIPTION OF THE PREFERRED EMBODIMENTS

Now, description will be given below of embodiments of a high-accuracy VR-type resolver according to the invention with reference to the accompanying drawings.

Here, assuming that a phase number N=3 and a variable M=3, the pole number of a resolver stator and teeth number of a resolver rotor are obtained according to the above-mentioned expression (1), and the results thereof are shown in Table 2.

TABLE 2

| 80 | 100 | 120 | 140 | 160 | 180 | 200 | 220 | 240 | 260 | 280 | 300 |
|----|-----|-----|-----|-----|-----|-----|-----|-----|-----|-----|-----|
| 24 | 30  | 36  | 42  | 48  | 54  | 60  | 66  | 72  | 78  | 84  | 90  |

Upper : Rotor teeth number
Lower : Stator pole number

Figure 1:
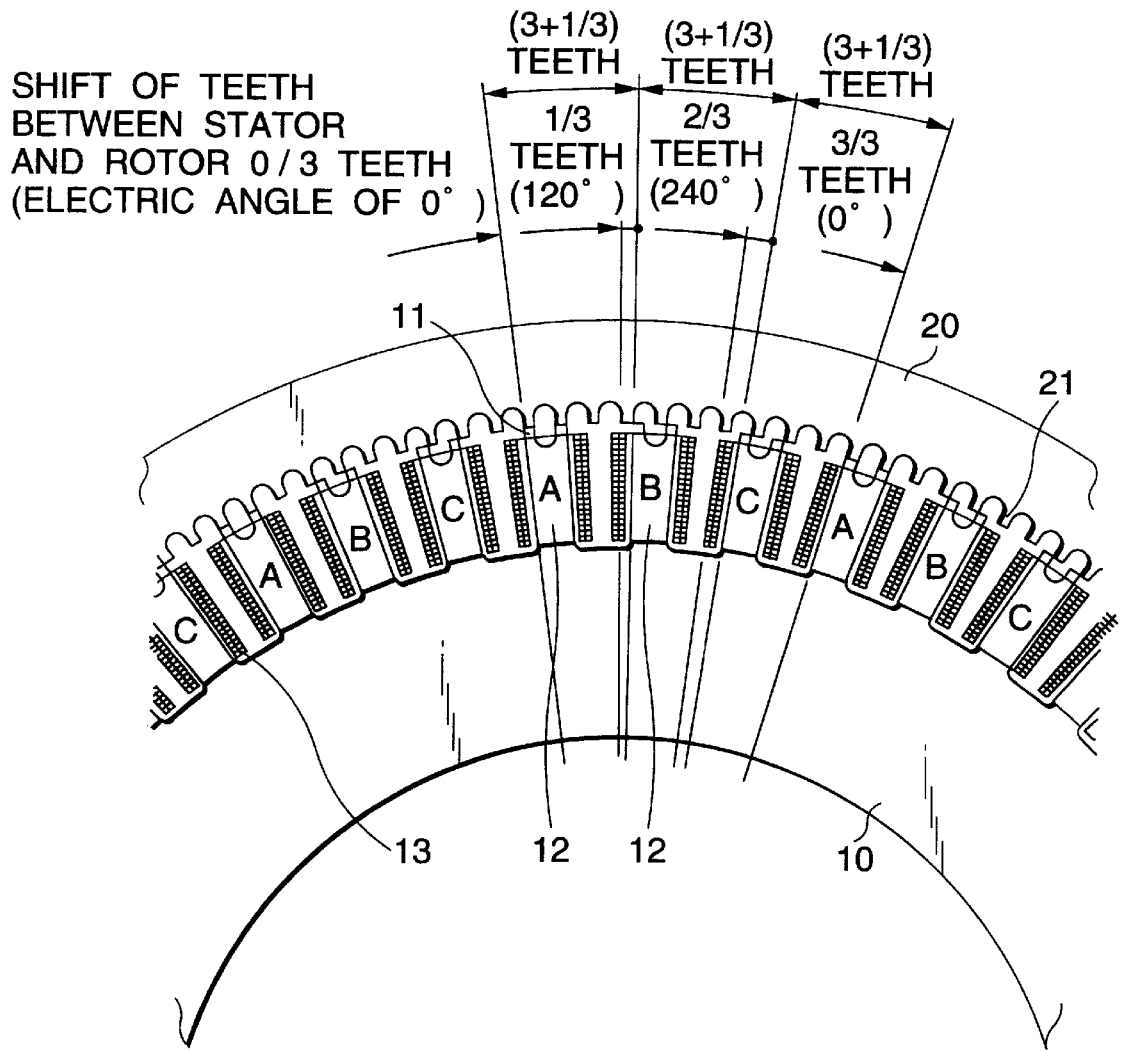
FIG. 1 is a typical view of the main portions of an embodiment of a VR-type resolver according to the invention, showing how the rotor and stator of the resolver are combined with each other.

By selecting the rotor teeth number and stator pole number from the values shown in Table 2, the structure of a high-accuracy 3-phase VR-type resolver can be obtained simply. By the way, the more the rotor teeth number selected is, the more the stator pole number is, that is, the further the whole periphery accuracy of the resolver is enhanced. A resolver rotor (which is an outer rotor) 20 shown in FIG. 1 includes the teeth number of 160 that is selected based on the values of Table 2. The number of the magnetic poles 12 of a resolver stator 10 that corresponds to the rotor teeth number of 160 is 48. As shown in FIG. 1 in which the rotor 20 and stator 10 are combined together, the magnetic poles 12 of the stator 10 exist, one magnetic pole for every (3+⅓) teeth of the rotor 20. Because coils are wound around their respective magnetic poles 12, with spaces for such coil windings taken into account, on the respective magnetic poles 12 of the stator 10, there are projectingly provided pole teeth 11, two pole teeth for one magnetic pole. In this manner, by increasing the pole number of the stator 10 using the relation between the stator pole number and rotor teeth number according to the expression (1), the center angles of the two mutually adjoining stator magnetic poles 12 and 12 can be reduced, so that the magnetic poles of the VR-type resolver can be increased easily. By the way, if there are sufficient spaces for the coil windings 13, the number of the pole teeth to be formed in each of the magnetic poles 12 of the stator 10 may as well be 3.

In this case, the pitch shift amount of the stator pole teeth with respect to the teeth 21 of the rotor 20 is 1/N: in particular, when an electric angle is 0°, ⅔ teeth (that is, no shift); when the electric angle is +120°, ⅓ teeth; when it is +240°, ⅔ teeth; and, when it is +360°, (that is, the start point of the next 0°,), ⅔ teeth (1 tooth). Therefore, in the present 3-phase VR-type resolver, there can be detected 3-phase signals which are shifted every electric angle +120°(360/3) at a ⅓ pitch.

Figure 2:
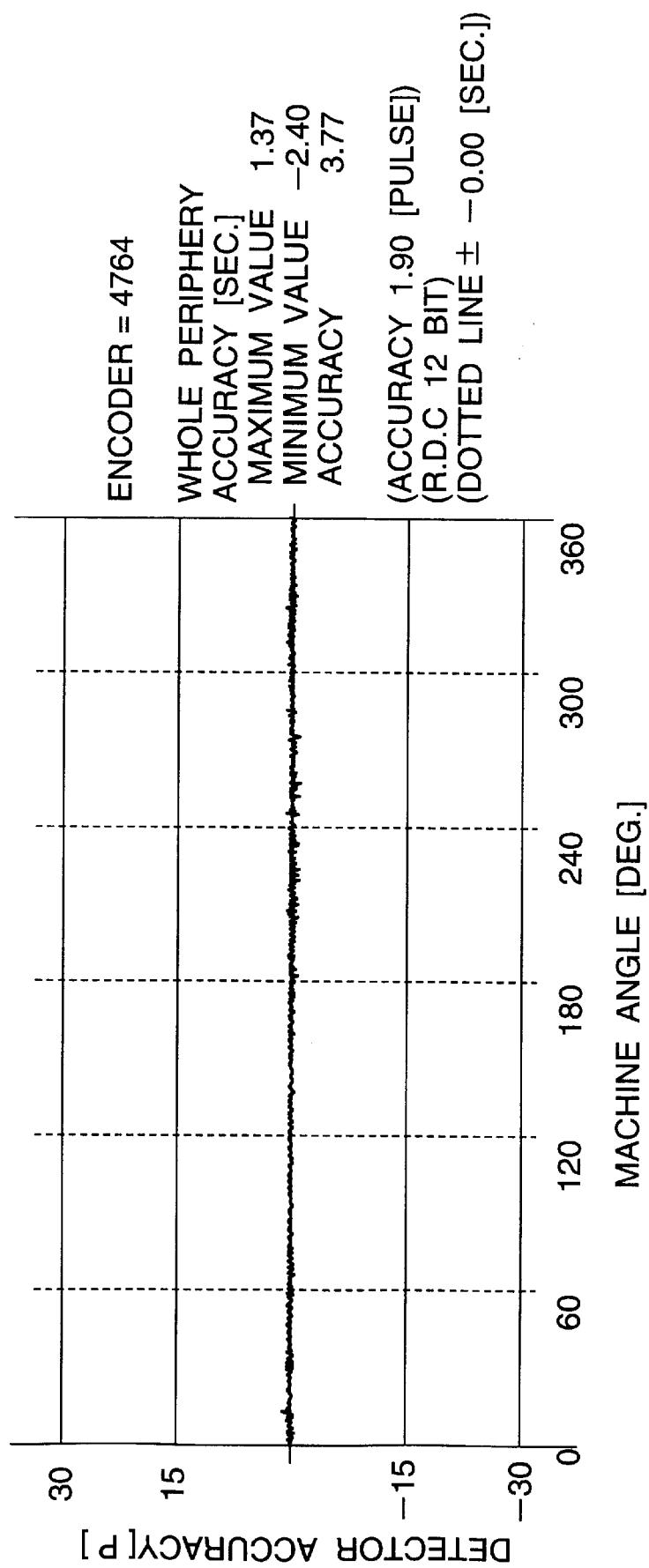
FIG. 2 is a graphical representation of the results of the whole periphery accuracy measurement of the VR-type resolver shown in FIG. 1.

Now, FIG. 2 shows the measured result of the whole periphery accuracy of the VR-type resolver shown in FIG. 1 according to the present embodiment in which the rotor teeth number of the resolver 20 is 160 and the pole number of the resolver stator 10 is 48, while the whole periphery accuracy of the present VR-type resolver was measured by a rotary encoder and the measured data thereof were recorded by an X-Y plotter. As shown in FIG. 2, the accuracy thereof was 3.77 sec., that is, it was a very high accuracy.

Also, in the above-mentioned embodiment, description has been given of a case in which a variable M=3 is set. However, the invention is not limited to this. For example, when the variable M=2 is set, for the rotor teeth number of 140, the stator pole number can be set as 60, and, for the rotor teeth number of 280, the stator pole number can be set as 120; and, when the variable M=1 is set, for the rotor teeth numbers of 80, 120, 160, 200, 240 and 280 that can respectively satisfy the conditions shown in the following table 3, the stator pole numbers can be set respectively.

TABLE 3

| 80 | 100 | 120 | 140 | 160 | 180 | 200 | 220 | 240 | 260 | 280 | 300 |
|----|-----|-----|-----|-----|-----|-----|-----|-----|-----|-----|-----|
| 60 | 75  | 90  | 105 | 120 | 135 | 150 | 165 | 180 | 195 | 210 | 225 |

Upper : Rotor teeth number
Lower : Stator pole number

Further, in the above-mentioned embodiment, description has been given of a case in which, in the 3-phase resolver, the stator magnetic poles are arranged every electric angle of +120°. However, the invention is not limited to this but, alternatively, it is also possible to arrange the stator magnetic poles every electric angle of −120°. In this case, the stator pole number may be determined according to the above-mentioned expression (2).

In this case, when the variable M=3 is set, it is only the stator pole number of 60 for the rotor teeth number of 220 that can satisfy not only the expression (2) but also the condition that the stator pole number is a multiple number and an even number. However, when the variable M=2 is set, there can be selected three stator pole numbers, that is, the stator pole number of 30 for the rotor teeth number of 80, the stator pole number of 60 for the rotor teeth number of 160, and the stator pole number of 90 for the rotor teeth number of 240. Further, when the variable M=1 is set, as shown in the following table 4, for all of the rotor teeth numbers, it is possible to decide the stator pole numbers that can satisfy the required conditions.

TABLE 4

| 80 | 100 | 120 | 140 | 160 | 180 | 200 | 220 | 240 | 260 | 280 | 300 |
|----|-----|-----|-----|-----|-----|-----|-----|-----|-----|-----|-----|
| 48 | 60  | 72  | 84  | 96  | 108 | 120 | 132 | 144 | 156 | 168 | 180 |

Upper : Rotor teeth number
Lower : Stator pole number

In this case, the amount of shift of the stator pole teeth 11 with respect to the teeth 21 of the rotor 20 is −1/N: in particular, when an electric angle is 0°, % teeth (that is, no displacement); when the electric angle is −120°, −⅓ teeth; when it is −240°, −⅔ teeth; and, when it is −360°,(that is, the start point of the next 0°,), −⅗ teeth(−1 tooth). Therefore, in the present 3-phase VR-type resolver, there can be detected 3-phase signals which are shifted every electric angle −120° (−360/3) at a −⅓ pitch.

As described above, an N-phase VR-type resolver according to the invention is a resolver which detects N-phase signals which are shifted every electric angle of (±360/N)° at a ±1/N pitch, and thus the present invention can also apply to other structures than the 3-phase structure. For example, in the case of a 4-phase resolver, it detects 4-phase signals which are shifted every electric angle of ±90° at ±¼ pitch; and, in the case of a 6-phase resolver, it detects 6-phase signals which are shifted every electric angle of ±60°at ±⅙ pitch. Thus, according to the present embodiment, as the variable M is decreased, the stator pole number is increased, thereby being able to enhance the whole periphery accuracy of the resolver.

By the way, in the above-mentioned embodiment, in the rotor and stator of the VR-type resolver, there are used the same laminations as the rotor and stator of the DD motor. However, if the resolver rotor has the same teeth number as the motor rotor, then it is not always necessary that the lamination of the resolver stator is identical with that of the motor stator.

Also, referring to the rotor teeth number, the rotor teeth number is not limited to the above-mentioned numbers but other numbers such as 68, 104, 124, 132 and the like can be selected arbitrarily according to cases, provided they are the rotor teeth number from which stator pole numbers capable of satisfying the above-mentioned conditions can be calculated according to the above-mentioned expression (1) or (2).

Now, in order to show the effects of the invention clearly, description will be given below of several embodiments according to the invention in contrast with their respective comparison examples.

Figure 3:
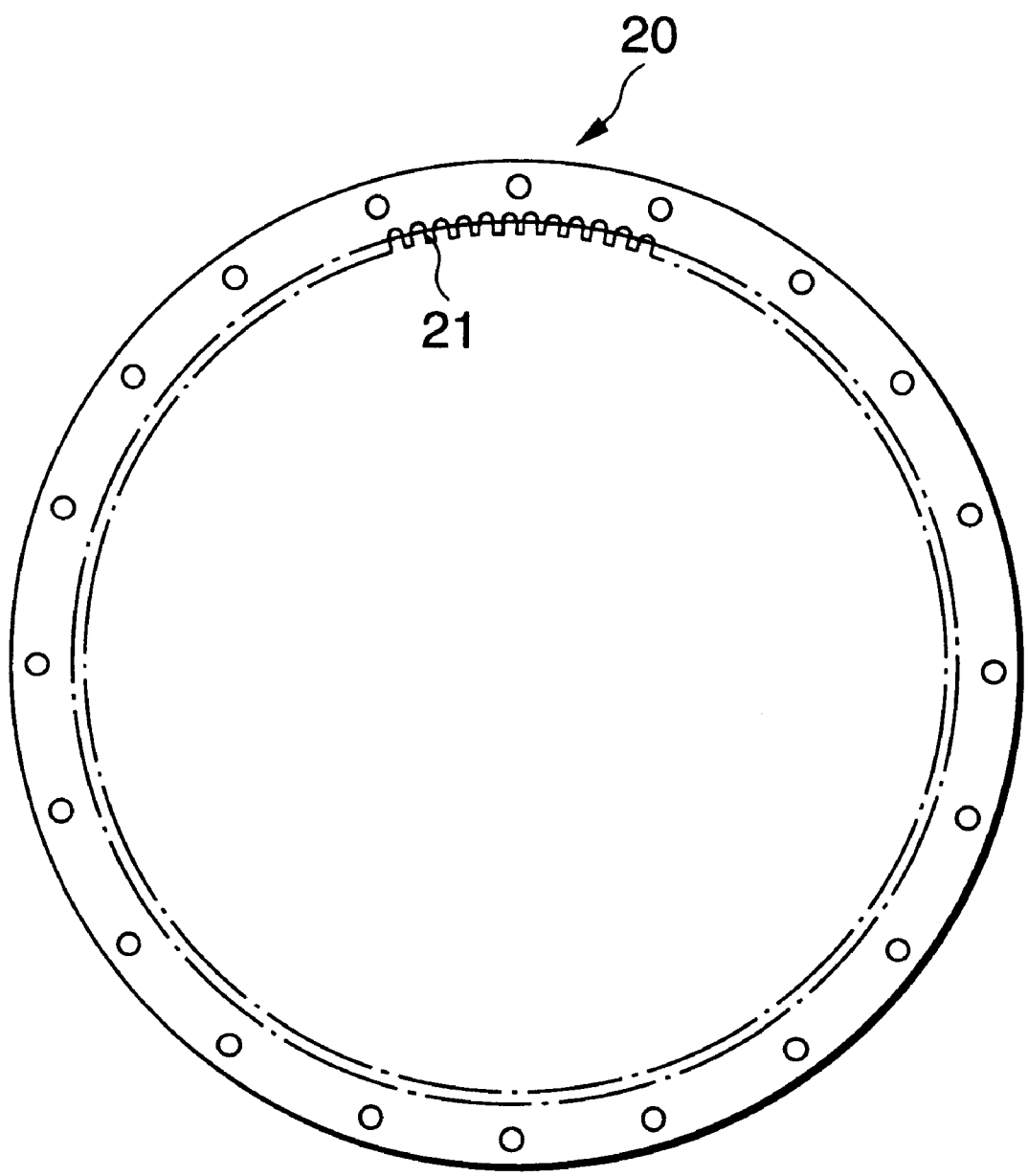
FIG. 3 is a schematic view of a resolver rotor lamination employed in a first embodiment according to the invention.
Figure 4:
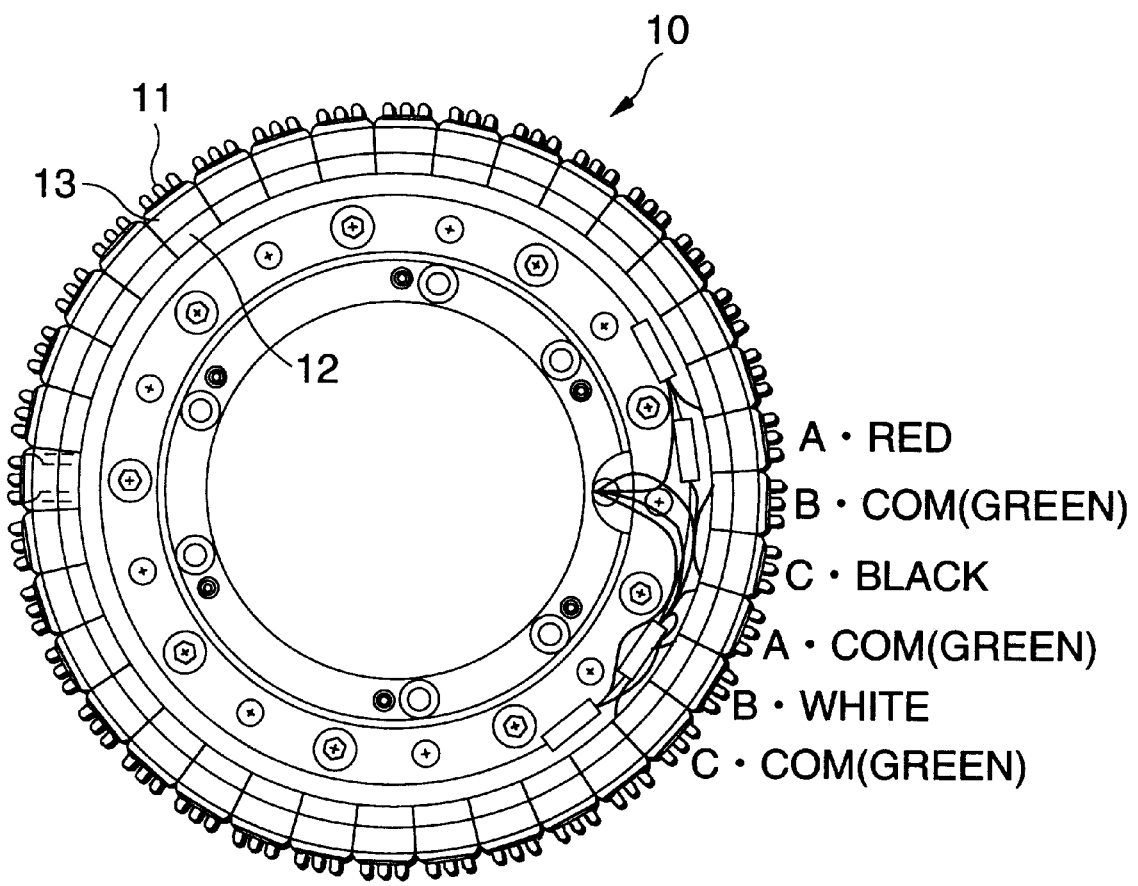
FIG. 4 is an assembly view of a resolver stator in the first embodiment.
Figure 5:
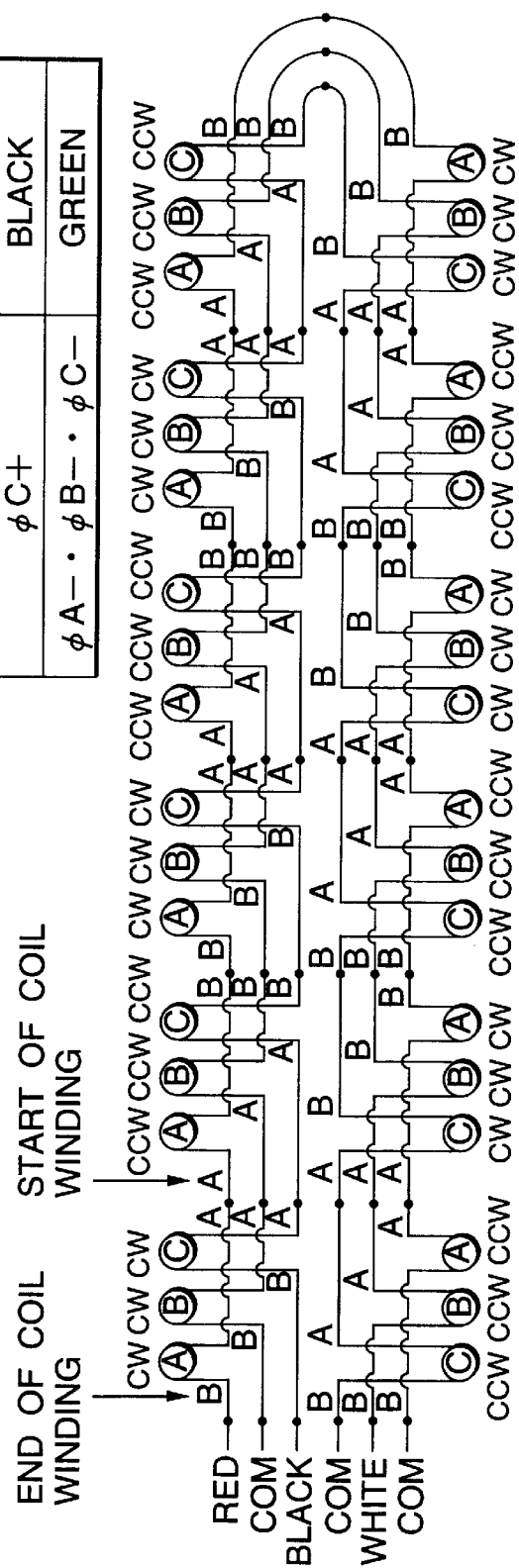
FIG. 5 is a connection view of coil windings employed in FIG. 4.

Embodiment 1: In FIGS. 3 to 5, there is shown a first embodiment of a VR-type resolver according to the invention.

In the present embodiment 1, the number of teeth 21 of a resolver rotor 20 shown in FIG. 3 is set as 120, whereas the number of magnetic poles of a resolver stator 10 is set as 36 according to the above-mentioned expression (1) and the number of pole teeth 11 per magnetic pole is set as 3. In FIG. 4, there is shown an assembly view of the resolver stator 10 including the pole number of 36 which has been manufactured under the above conditions and, in FIG. 5, there is shown a connection view of coils wound around the magnetic poles of the resolver stator 10.

Figure 6:
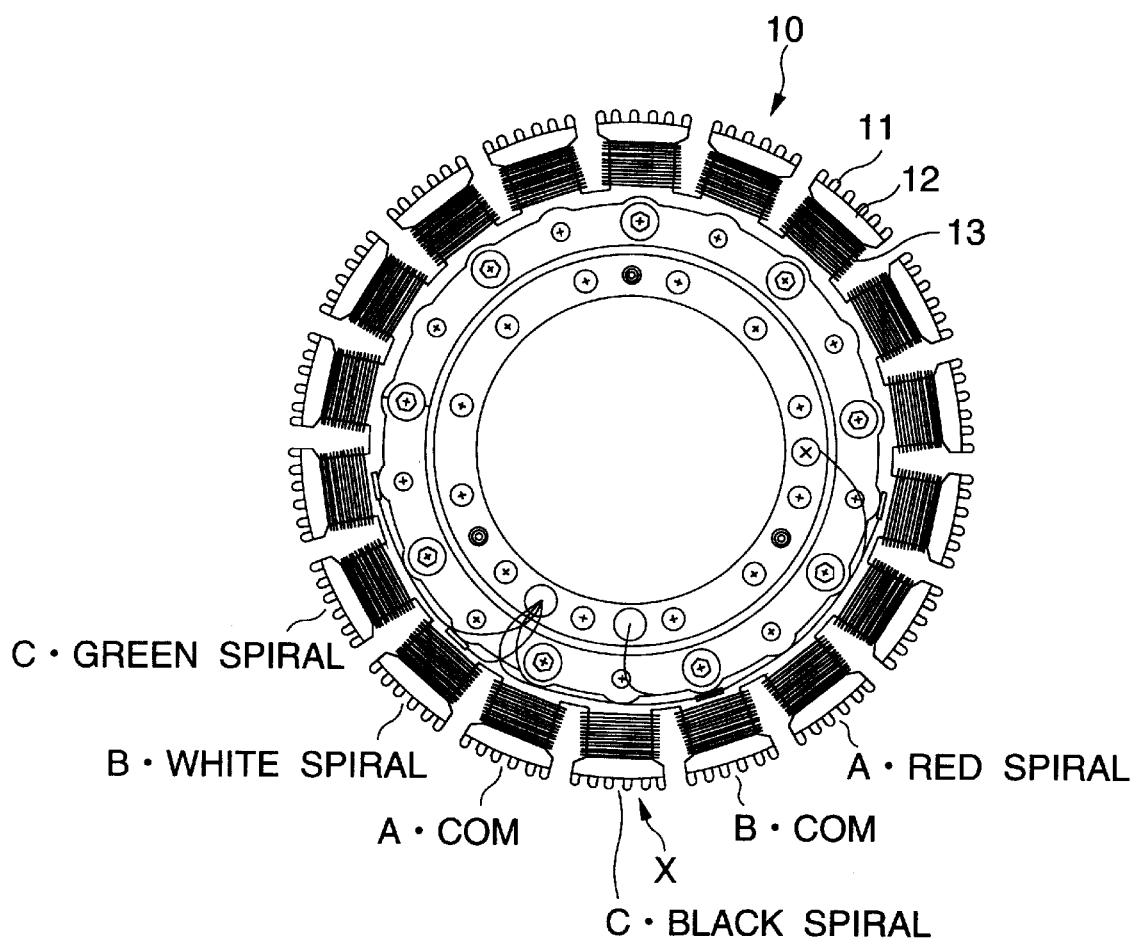
FIG. 6 is an assembly view of a resolver stator employed in a comparison example 1 in contrast to the first embodiment.
Figure 7:
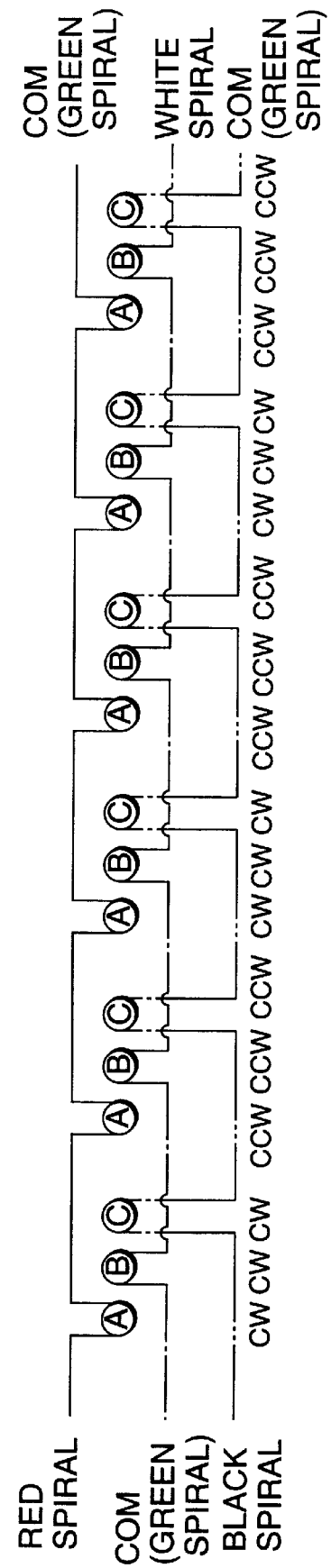
FIG. 7 is a connection view of coil windings employed in the comparison example 1.

Comparison example 1: On the other hand, in a comparison example, a VR-type resolver, in which the magnetic poles 12 of the resolver stator 10 thereof are different in number from the above-mentioned embodiment 1 of the invention, was manufactured and was then compared with the embodiment 1. In particular, in the VR-type resolver according to the comparison example 1, the number of the teeth of the resolver rotor 20 was set equal to that of the embodiment 1 (FIG. 3), that is, 120, whereas the number of the magnetic poles of the resolver stator 10 was set smaller than that of the embodiment 1, that is, 18, and also the number of pole teeth 11 per magnetic pole was set as 6. FIG. 6 shows an assembly view of the resolver stator of the comparison example 1, and FIG. 7 shows a connection view of coils respectively wound around the magnetic poles of the resolver stator of the comparison example 1.

Figure 8:
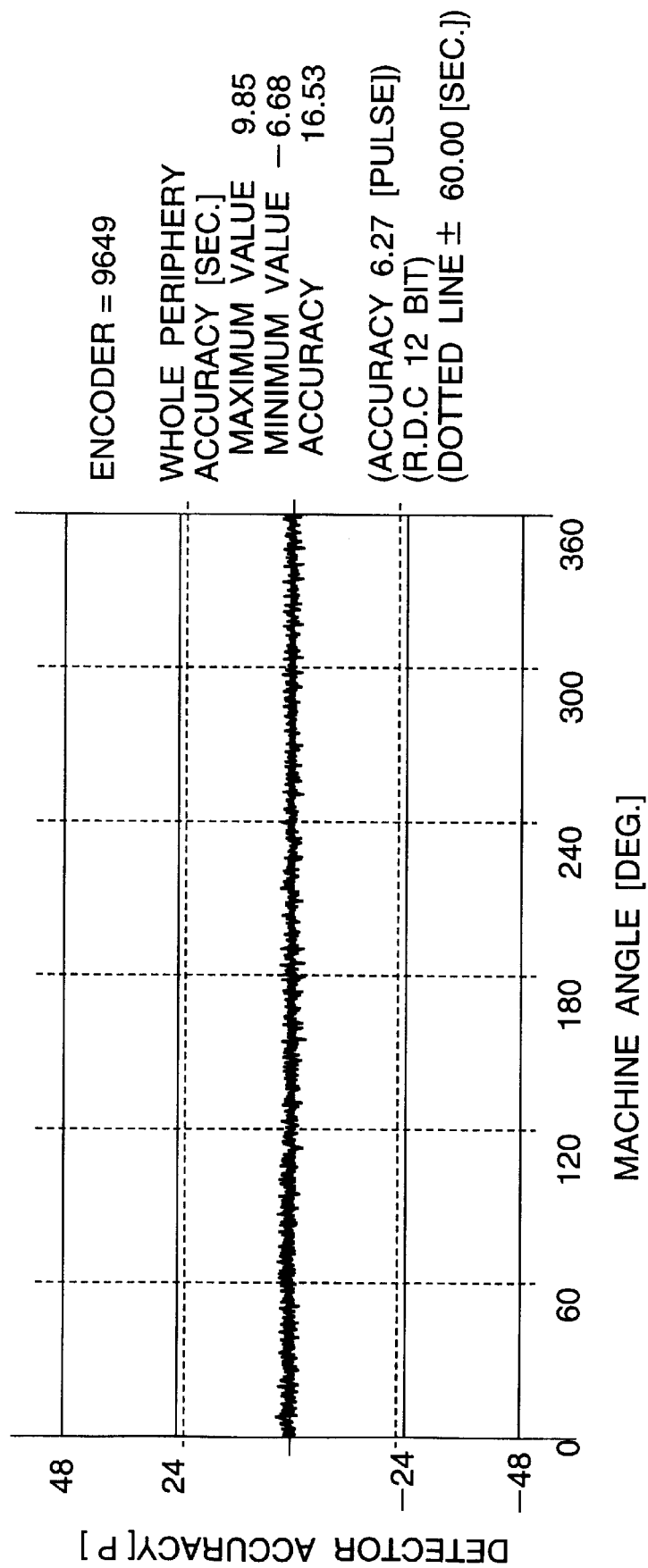
FIG. 8 is a graphical representation of the results of the whole periphery accuracy measurement of the first embodiment.
Figure 9:
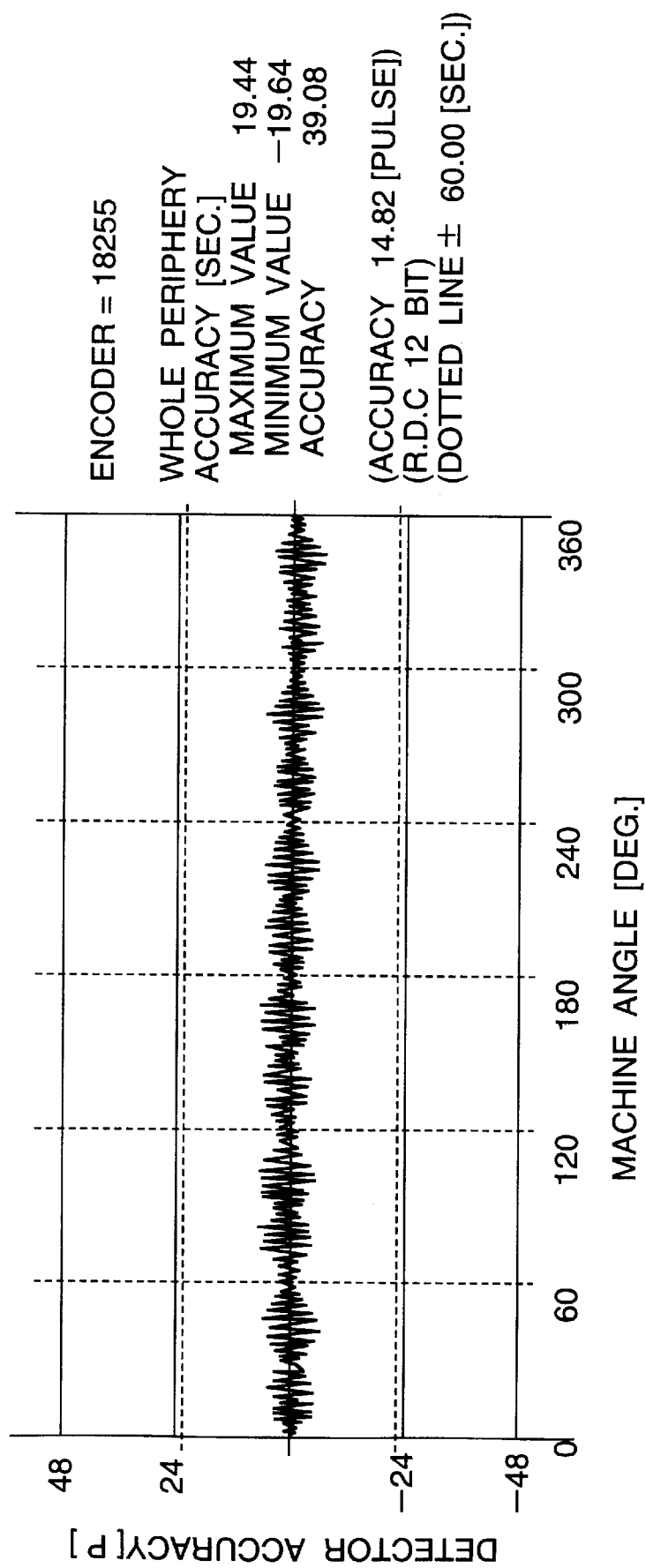
FIG. 9 is a graphical representation of the results of the whole periphery accuracy measurement of the comparison example 1.

The whole periphery accuracy of the VR-type resolver according to the embodiment 1 was measured using a rotary encoder and the measured data thereof were recorded by an X-Y plotter, while the thus measured and recorded results are shown in FIG. 8. As can be seen from FIG. 8, the accuracy was 16.53 sec., which is a very high accuracy. On the other hand, as shown in FIG. 9, the accuracy obtained in the comparison example 1 was 39.08 sec., which is less than half of the accuracy in the embodiment 1.

Figure 10:
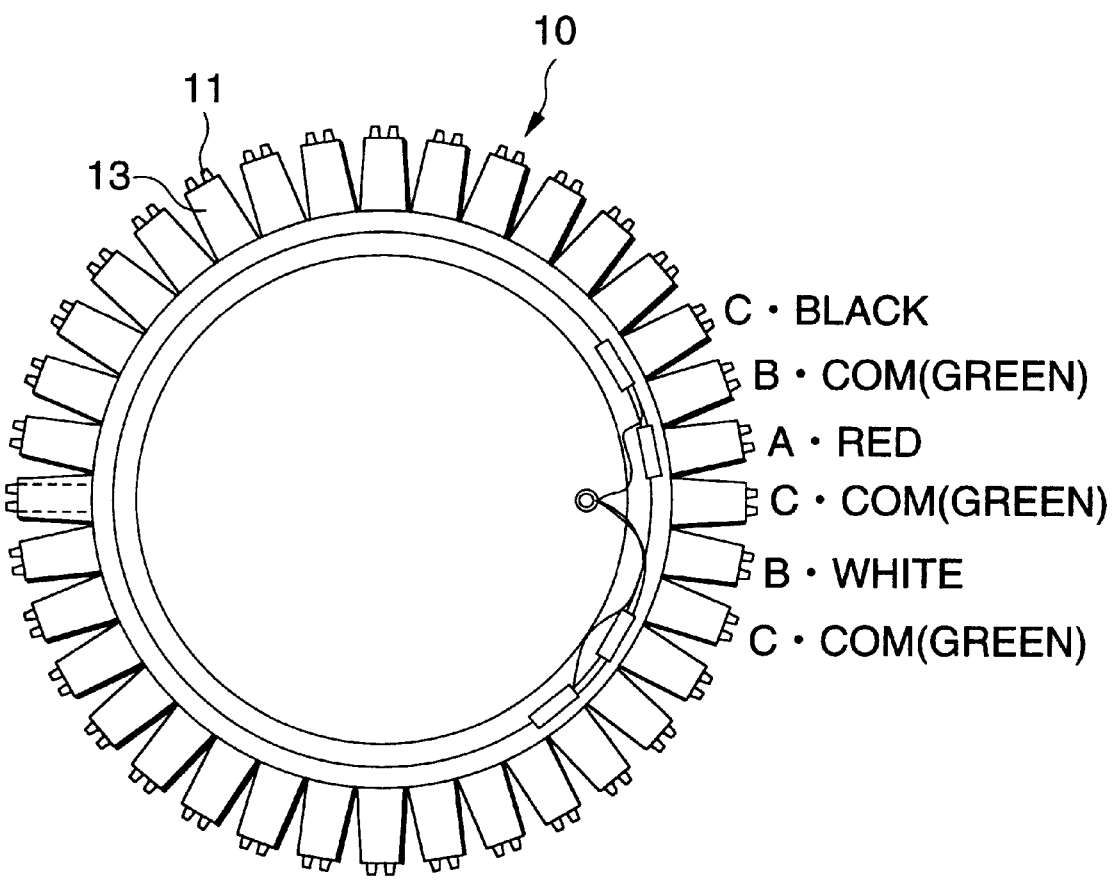
FIG. 10 is an assembly view of a resolver stator employed in a second embodiment according to the invention.
Figure 11:
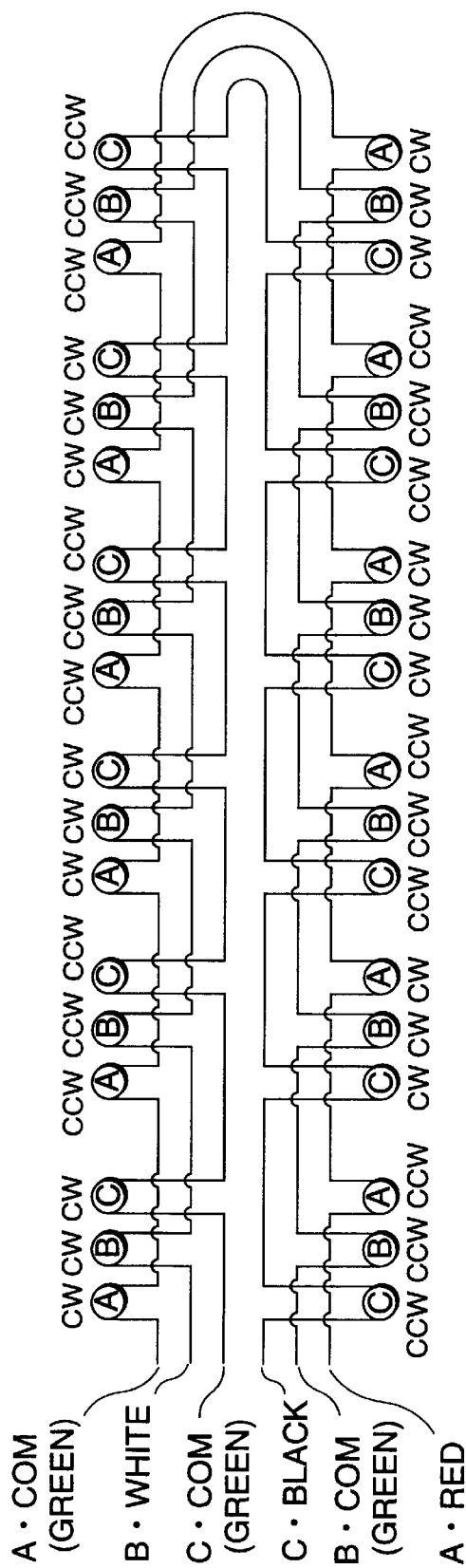
FIG. 11 is a connection view of coil windings employed in the second embodiment.

Embodiment 2: In this embodiment, the teeth number of the resolver rotor 20 was set equal to that of the embodiment 1, that is, 120. The number of the magnetic poles of the resolver stator 10 was set as 36, while the number of the pole teeth 11 per magnetic pole was set as 2. And, the thus designed resolver stator 10 was manufactured separately from the embodiment 1. FIG. 10 shows an assembly view of the resolver stator 10 and FIG. 11 shows a connection view of coils respectively wound around the resolver stator 10.

Comparison example 2: As a comparison example 2 to be compared with the embodiment 2, separately from the comparison example 1, there was manufactured a VR-type resolver of a conventional type in which a resolver rotor 20 of an outer rotor type having the same teeth number as that of the comparison example 1, that is, 120 was combined with a resolver stator 10 including 18 magnetic poles, each magnetic pole having 6 pole teeth.

Figure 12:
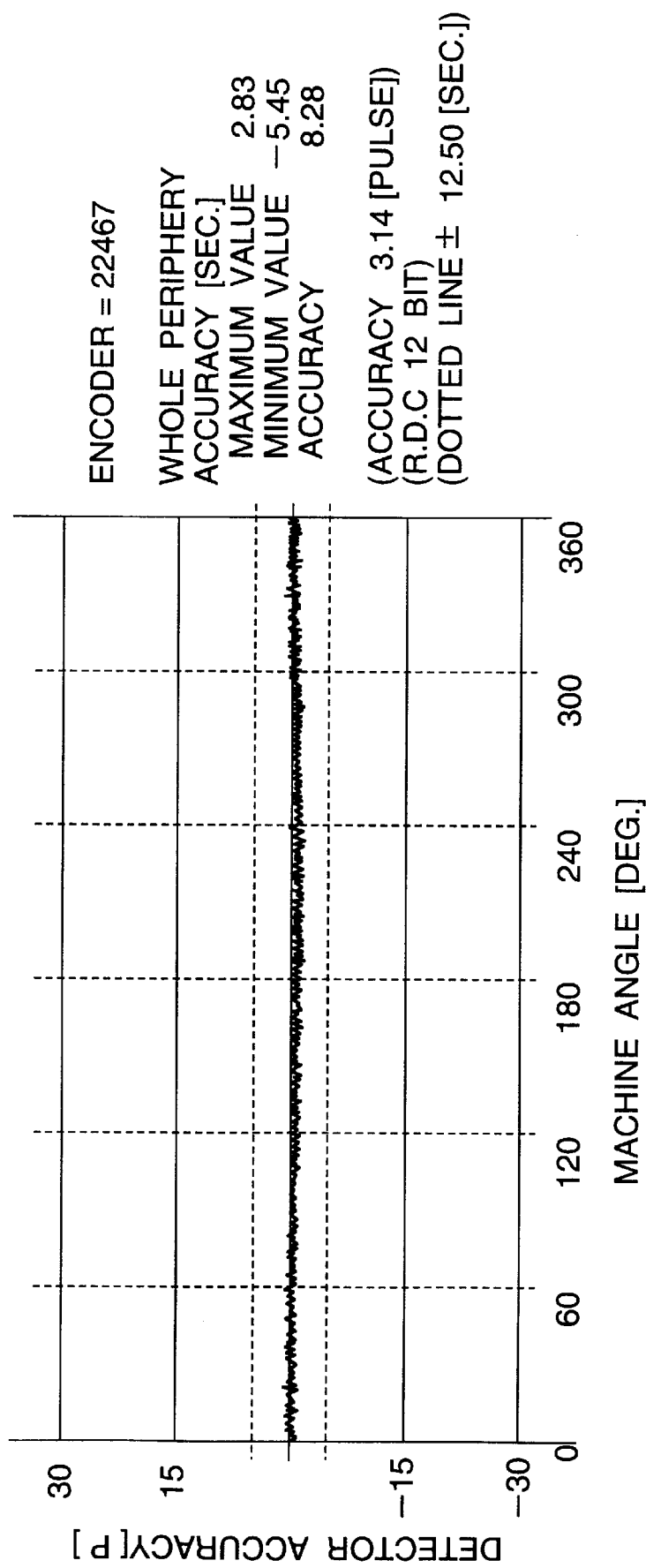
FIG. 12 is a graphical representation of the results of the whole periphery accuracy measurement of the second embodiment.
Figure 13:
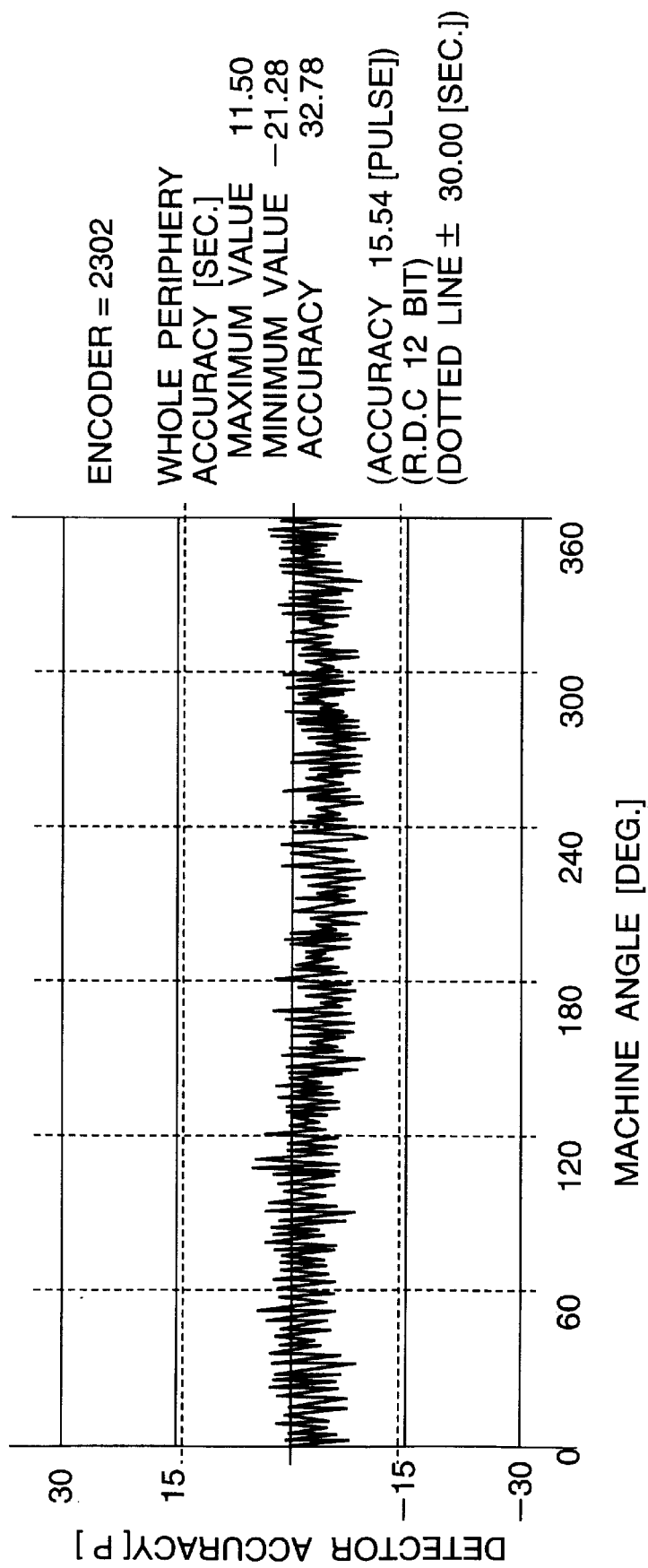
FIG. 13 is a graphical representation of the results of the whole periphery accuracy measurement of a comparison example 2.

The whole periphery accuracy of the VR-type resolver according to the embodiment 2 was measured using a rotary encoder and the measurement data were recorded by an X-Y plotter. The results are shown in FIG. 12. As can be seen from FIG. 12, the accuracy of the embodiment 2 is 8.28 sec., which shows a very high accuracy. In contrast to this, as shown in FIG. 13, the accuracy of the comparison example 2 is 32.78 sec., which is only about ¼ of the accuracy of the embodiment 2.

As can be seen from the comparisons respectively drawn between the embodiments 1, 2 and comparison examples 1, 2, for example, in the case of a 3-phase VR-type resolver, when the teeth numbers of the resolver rotor and motor rotor are both set as 120, if the pole number of the resolver stator is set as 36 using the above-mentioned expression (1) according to the invention, then the whole periphery accuracy can be enhanced further when compared with the conventional VR-type resolver in which the pole number of the resolver stator is set as 18.

Figure 14A:
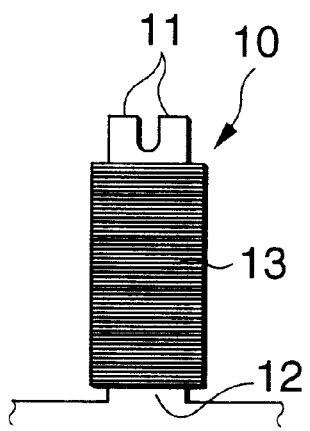
FIGS. 14A and 14B are typical views to explain the relation between the coil winding of a resolver stator and the shape of a magnetic pole of the resolver stator, in particular.
Figure 14B:
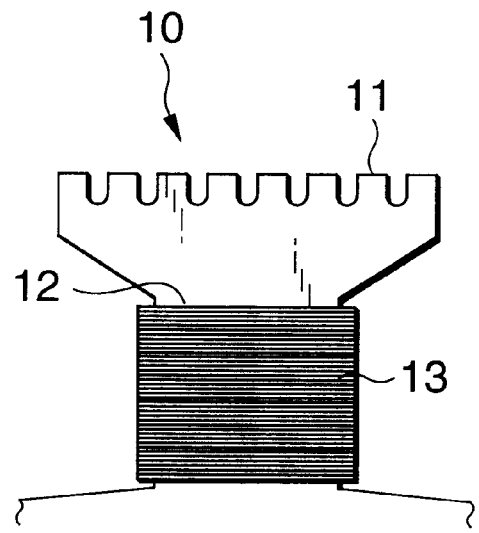

Here, description will be given of the advantages of the VR-type resolver according to the invention in manufacturing the same. For example, in the case of the resolver stator 10 according to the embodiment 2 (in which the number of the pole teeth 11 per magnetic pole is set as 2), as shown in FIG. 14A, the shape of the magnetic pole 12 thereof allows employment of the well-ordered winding of the coil winding 13. That is, since the shape of the magnetic pole 12 is not constricted at all, a wound coil winding 13 (such as a bobbin, a hollow core coil or the like) can be formed in such a manner that the magnetic pole 12 can be inserted into the wound coil winding 13, which can simplify the method for winding the coils around the magnetic poles. Also, because a uniform winding can be obtained, imbalance among the three phases can be minimized. On the other hand, as shown in FIG. 14B, in a conventionally ordinary resolver stator in which the number of the pole teeth 11 per magnetic pole is set large), because a coil winding 13 is wound directly around the root portion of the magnetic pole 12, it is difficult to obtain a uniform winding shape.

As has been described heretofore, according to the invention, in an N-phase VR-type resolver, the pole number of the resolver stator with respect to the teeth number of the resolver rotor can be set by calculation using either of the aforementioned expressions (1) and (2).

Thanks to this, there can be easily obtained a very high-accuracy VR-type resolver which allows a motor to be positioned with an absolute accuracy of 10 sec. or less without increasing the pole number of the resolver stator up to the limit thereof.

Also, while the ripple of the VR-type resolver generally has an influence on the vibrations that are generated when it is accelerated or decelerated and when it is operated at a constant speed, since the accuracy of the resolver is enhanced in the above-mentioned manner, the generation of the ripple can be restricted to thereby be able to reduce the vibrations of the resolver.

Further, the enhanced accuracy of the resolver is able to reduce greatly the noise that is produced due to a detector error when the motor is actuated.

Still further, the reduced pole teeth number of the resolver stator not only can simplify the method for winding the coils to be wound around the resolver stator, but also can provide a uniform winding to thereby be able to minimize the imbalance among the three phases.

Figure 15A:
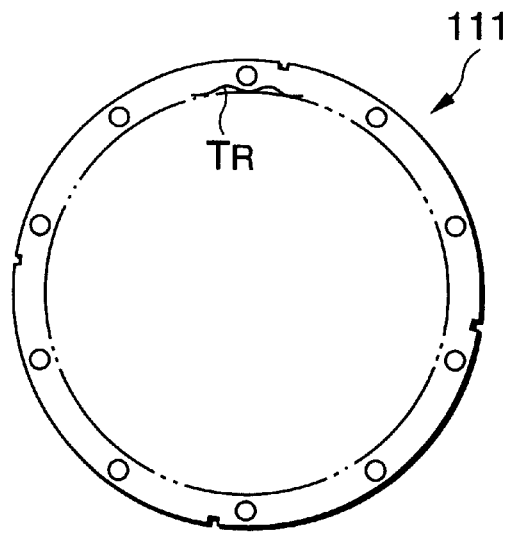
FIGS. 15A and 15B show a third embodiment of a VR-type resolver according to the invention, in particular.
Figure 15B:
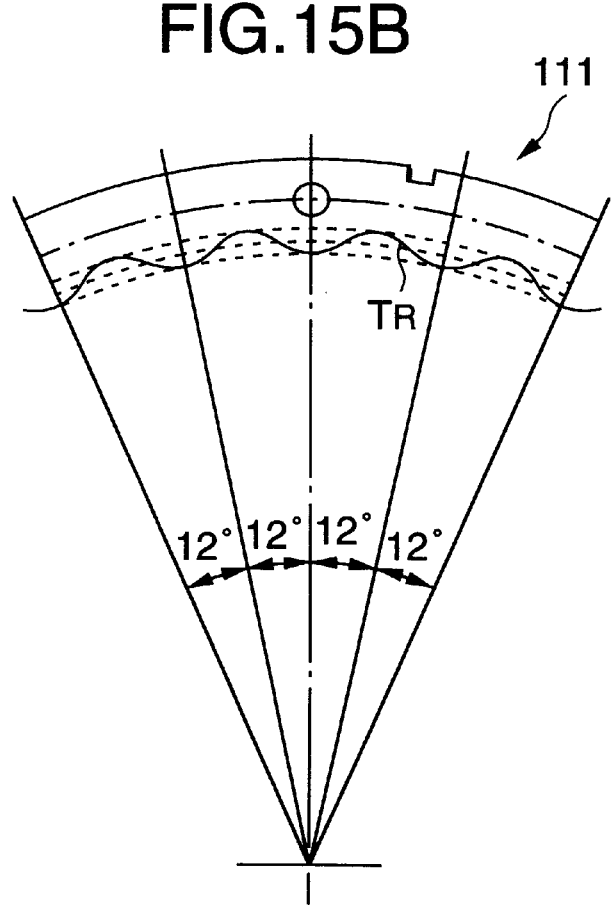
Figure 16A:
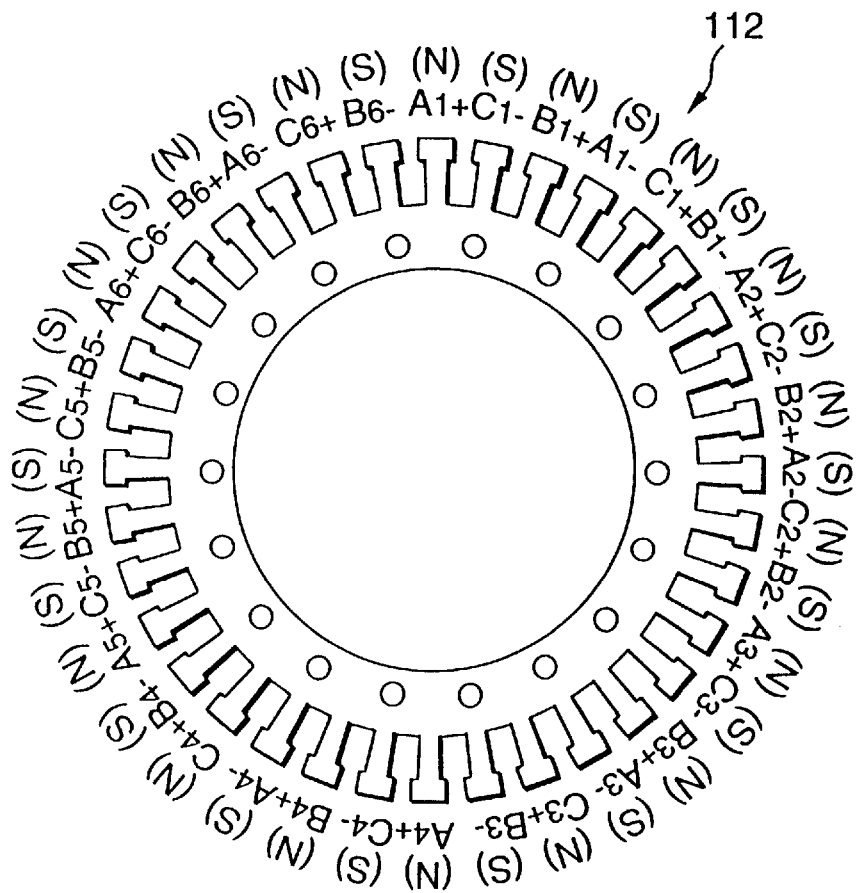
FIG. 16A is a plan view of the lamination of a stator to be combined with the rotor shown in FIG. 15A.
Figure 16B:
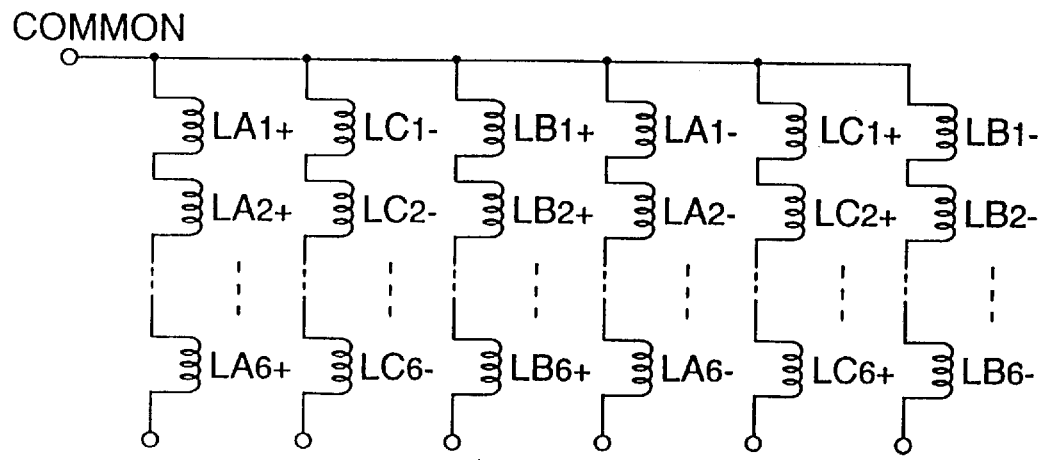
FIG. 16B is a view of excitation windings specifications employed in the present stator.

Next, FIGS. 15 and 16 respectively show a VR-type resolver of an outer rotor type which is a third embodiment according to the invention. In particular, FIG. 15A is a schematic plan view of a rotor employed in the present VR type resolver (the teeth shape thereof is omitted), FIG. 15B is an enlarged view of the teeth shape of the rotor shown in FIG. 15A; and, FIG. 16A is a plan view of the lamination of a stator employed in the present VR type resolver, and FIG. 16B is a schematic view of excitation windings specifications employed in the present stator. The present VR type resolver comprises a freely rotatable rotor or iron core 111 composed of a plurality of rotor laminations each having such a shape as shown in FIG. 15A, and a stator 112 which is fixedly disposed inside the rotor iron core 111 and is composed of a plurality of stator laminations each having a shape as shown in FIG. 16A.

On the inner peripheral surface of the rotor 111 mounted integrally on a rotary body, there are formed a plurality of rotor teeth $T_R$ which are formed over the whole periphery of the rotor 111 inner peripheral surface and consist of raised portions having the same shape or a sine wave shape at regular intervals. The number of the rotor teeth $T_R$ is set smaller than the number of teeth of a rotor of a DD motor (not shown) on which the present RV type resolver is mounted (that is, the pitch of the rotor teeth $T_R$ of the present RV type resolver is enlarged over that of the DD motor). In the present embodiment, the rotor teeth number of the DD motor is 120, whereas the rotor teeth number of the resolver is 30, that is, a quarter of the rotor teeth number of the motor.

On the other hand, the number of magnetic poles provided on and projected from the outer peripheral surface of the stator 112 of the resolver is set 6/5 of the teeth number of the rotor 111 of the resolver. That is:

Resolver stator magnetic pole number=resolver rotor teeth number×6/5. In the present embodiment, 30 teeth×6/5= 36 magnetic poles. If the relation between the rotor teeth number and stator magnetic poles number is defined in this manner, then there can be constructed a 6-phase differential resolver.

The shown stator 112 is a stator which is used in a 30-teeth 6-phase differential resolver. In the stator 112, 3-phase 18-pole first magnetic poles $A_{1+}$–$A_{6+}$, $B_{1+}$–$B_{6+}$, and $C_{1+}$–$C_{6+}$, which are respectively projected in the radial direction of the stator 112, are formed at given intervals in this order; and, at the respective intermediate positions of these first magnetic poles $A_{1+}$–$A_{6+}$, $B_{1+}$–$B_{6+}$, and $C_{1+}$–$C_{6+}$, 3-phase 18-pole second magnetic poles $A_{1-}$–$A_{6-}$, $B_{1-}$–$B_{6-}$ and $C_{1-}$–$C_{6-}$ are formed; that is, the respective magnetic poles are arranged in the order of $A_{1+}$–$C_{1-}$–$B_{1+}$–$A_{1-}$–$C_{1+}$ –$B_{1-}$–$A_{2+}$–$C_{2-}$ - - - . And, excitation windings $LA_{1+}$–$LC_{6-}$ are respectively wound around the magnetic poles $A_{1+}$–$C_{6-}$.

Referring to the arrangement of the excitation windings $LA_{1+}$–$LC_{6-}$ of the respective magnetic poles $A_{1+}$–$C_{6-}$, as shown in FIG. 16B, the excitation windings $LA_{1+}$–$LA_{6+}$, $LB_{1+}$–$LB_{6+}$, $LC_{1+}$–$LC_{6+}$ of the first respective magnetic poles $A_{1+}$–$A_{6+}$, $B_{1+}$–$B_{6+}$, $C_{1+}$–$C_{6+}$ are respectively connected in series; and, in particular, the excitation windings $LA_{1+}$, $LB_{1+}$, $LC_{1+}$ sides thereof are connected to a single-phase a.c. power source, while the excitation windings $LA_{6+}$, $LB_{6+}$, $LC_{6+}$ sides thereof are grounded through resistors. Also, the excitation windings $LA_{1-}$–$LA_{6-}$, $LB_{6-}$–$LB_{6-}$, $LC_{1-}$–$LC_{6-}$ of the remaining second magnetic poles $A_{1-}$–$A_{6-}$, $B_{1-}$–$B_{6-}$, $C_{1-}$–$C_{6-}$ are respectively connected in series; and, in particular, the excitation windings $LA_{1-}$, $LB_{1-}$, $LC_{1-}$ sides thereof are similarly connected to a single-phase a.c. power source, while the excitation windings $LA_{6-}$, $LB_{6-}$, $LC_{6-}$ sides thereof are grounded through resistors.

The circuit configuration of the present resolver is similar to that disclosed in Japanese Patent Publication No. Hei. 5-122916. In brief, according to the present circuit, current variations, which correspond to reactance variations between the stator of the resolver and rotor teeth $T_R$, are detected as voltages from output terminals derived from between the excitation windings $LA_{6+}$, $LB_{6+}$, $LC_{6+}$, $LA_{6-}$, $LB_{6-}$, $LC_{6-}$ and resistors connected to these excitation windings; among the detected currents, currents having a single phase are supplied to a differential amplifier circuit, where differences between the currents are calculated; the output signals of the differential amplifier circuit are converted into two-phase signals by a phase converter circuit to thereby remove the harmonic distortion of permeance; and, the resultant signals are processed by a signal processing circuit, thereby being able to detect the accurate rotational angle or rotational speed of an actuator or a DD motor.

The above-mentioned signal processing circuit comprises two multipliers into which signals converted to a two-phase signals are input individually as multiplicands and digital rotation angle detected values from a counter are input as multipliers, a subtractor into which the resultant multiplication outputs are input from the multipliers, a synchronous rectifier into which the resultant subtraction outputs are input from the subtractor and an a.c. voltage from an exciting single-phase power source is input as a synchronous signal, a voltage control oscillator into which the output of the synchronous rectifier is input, a counter into which the resultant oscillation output is input from the voltage control oscillator. In the thus structured signal processing circuit, the output of the synchronous rectifier is output as a speed signal and also a digital value indicating the rotational angle of the actuator is output from the counter.

In the conventional resolver, if the teeth number of the rotor thereof is reduced, the resolving power thereof is worsened. However, in the resolver according to the invention, in the above-mentioned processing by the counter, the output signal from the stator coil is multiplied to thereby be able to compensate the reduction in the resolving power caused by the decreased number of the rotor teeth $T_R$. That is, in the case where the teeth number of the resolver rotor is set for 1/4 (1/n) of the teeth number of the conventional resolver rotor, when the output signal from the stator coil of the resolver is processed by the counter, the output signal is multiplied by 4 (n) to thereby be able to secure a resolving power equivalent to the resolving power that can be obtained by the conventional resolver.

Next, description will be given below of the above-structured resolver.

In the resolver according to the present embodiment, the number of the teeth $T_R$ of the rotor 111 is 30, and this is only 1/4 of 120 which is the number of the teeth of the DD motor on which the present resolver is mounted. When the teeth number of the rotor of the resolver is reduced in this manner, there can be enhanced the whole periphery accumulation accuracy of the rotation position detection in which the respective teeth pitch errors are accumulated. Now, assuming that a DD motor having a rotor teeth number of 120 is rotated 1 rps, if the rotor teeth number of a resolver mounted on the present DD motor is 120 or equal to that of the DD motor, then there is generated a vibration frequency of 120 Hz/rps. However, in fact, since the rotor teeth number of the resolver according to the present embodiment is 30 or 1/4 of that of the DD motor, a vibration frequency generated due to the position detect error of the resolver is also 1/4, that is, 30 Hz/rps, so that the vibration of the resolver is lowered. With the lowered vibration of the resolver, the whole periphery accuracy is enhanced.

Figure 17A:
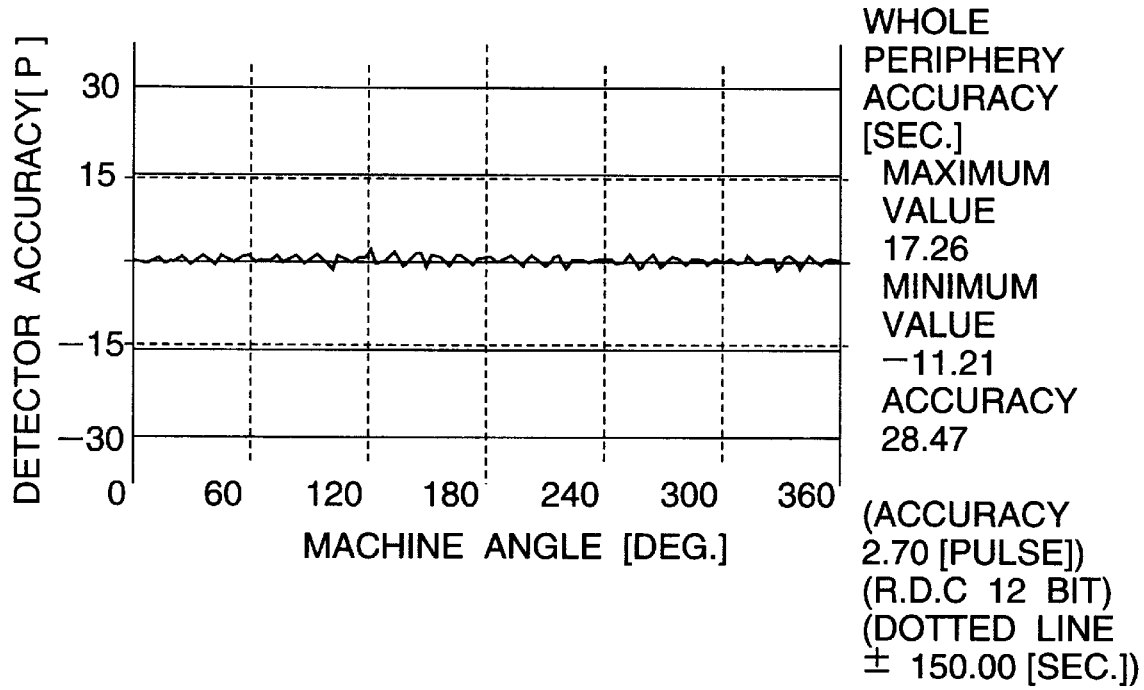
FIGS. 17A and 17B are graphical representations of the relation between the rotor teeth number of a resolver and rotation position measurement accuracy, in particular.
Figure 17B:
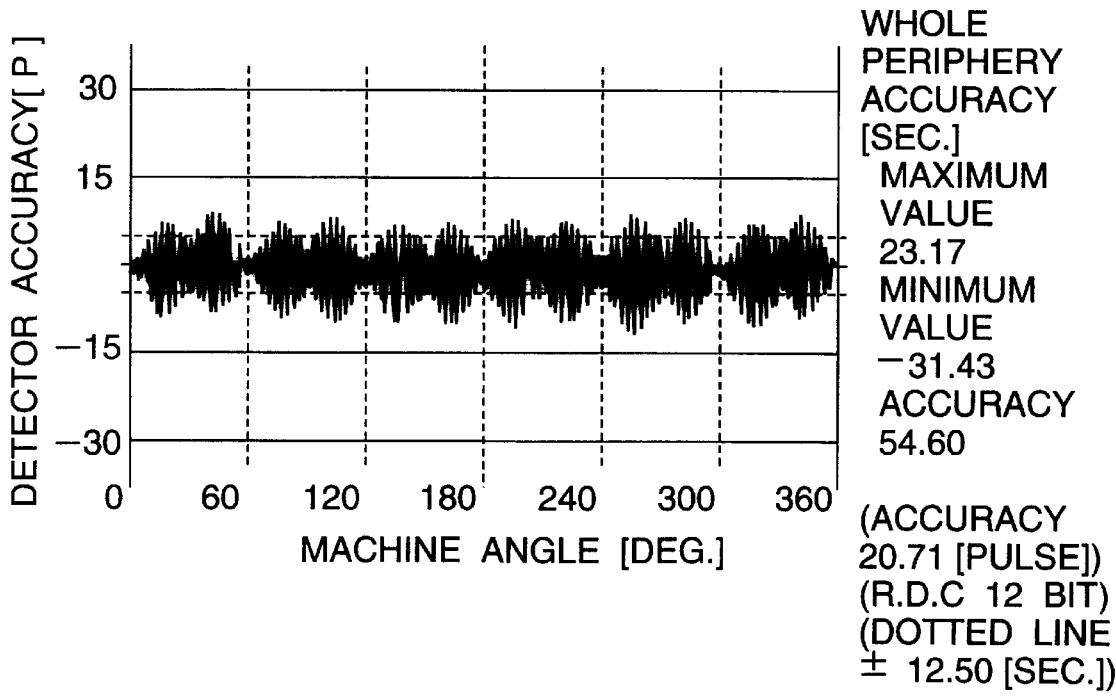

Here, in FIGS. 17A and 17B, there are shown the results which are obtained when the respective whole periphery accuracies of two resolvers differing in the teeth number are measured using a rotary encoder and the resultant measurements are recorded by an X-Y plotter. In particular, FIG. 17A shows the whole periphery accuracy of the resolver having 30 pieces of teeth according to the third embodiment of the invention, whereas FIG. 17B shows the whole periphery accuracy of the conventional resolver having 120 pieces of teeth. As can be seen from FIGS. 17A and 17B, the whole periphery accuracy of the resolver having 30 pieces of teeth is 28.47 sec., whereas the whole periphery accuracy of the conventional resolver having 120 pieces of teeth is 54.60 sec. That is, the former is enhanced in the whole periphery accuracy about twice the latter because the teeth number of the former is reduced down to 1/4 of that of the latter. The resolver according to the present embodiment, with the teeth number thereof reduced, not only can detect the rotation position of the motor with high accuracy in this manner, but also is able to increase the pitch of the resolver stator by an amount equivalent to the reduction in the teeth number of the resolver rotor 111 (that is, the increased teeth pitch) and increase the areas of the teeth top portions. The increased areas of the teeth top portions increase the magnetic flux of the resolver, so that the air gap in the resolver can be set in an increased size. Accordingly, even in a resolver having a small diameter, the air gap thereof can be set larger than that of the conventional resolver. Therefore, according to the present embodiment, there can be obtained the following effects: that is, (1) working and assembling are easier than in the conventional art, and (2) the teeth pitch error and the like can be reduced so that the whole periphery accumulation accuracy of the position detection can be enhanced.

Also, even when the present resolver is mounted on a DD motor for vacuum, a separation wall is interposed between the air gaps of the stator and rotor thereof, and the resolver is used while the stator side thereof is set in the open air and the rotor side thereof is set in the vacuum atmospheric condition, there is no need to make the separation wall very thin as in the conventional art, and thus it is possible to prevent the separation wall from being expanded when the resolver is used under the ultra-high vacuum condition. Further, because the teeth $T_R$ of the rotor 111 of the resolver according to the present embodiment are respectively formed in a sine wave shape, the teeth of the present resolver are simplified in shape over the square-shaped teeth of the conventional resolver and are thus easier to work.

Figure 18A:
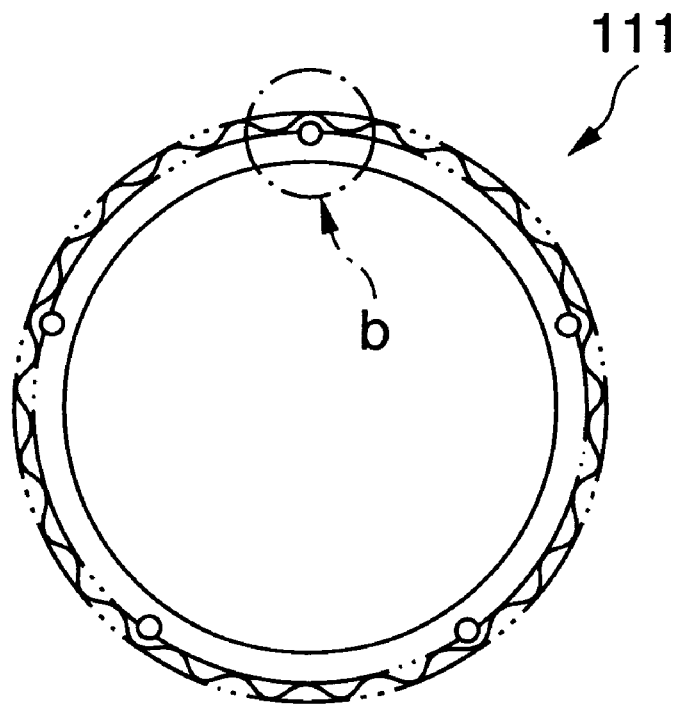
FIGS. 18A and 18B show a fourth embodiment of a VR-type resolver according to the invention, in particular.
Figure 18B:
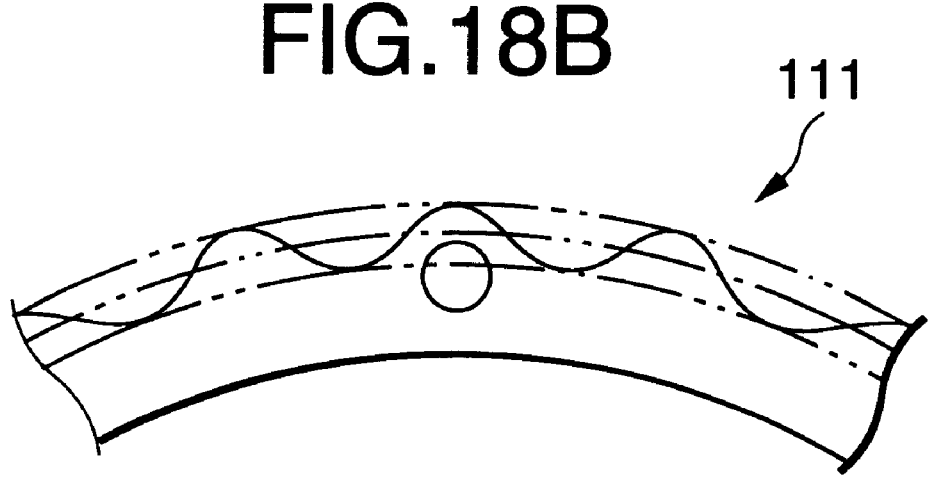
Figure 19A:
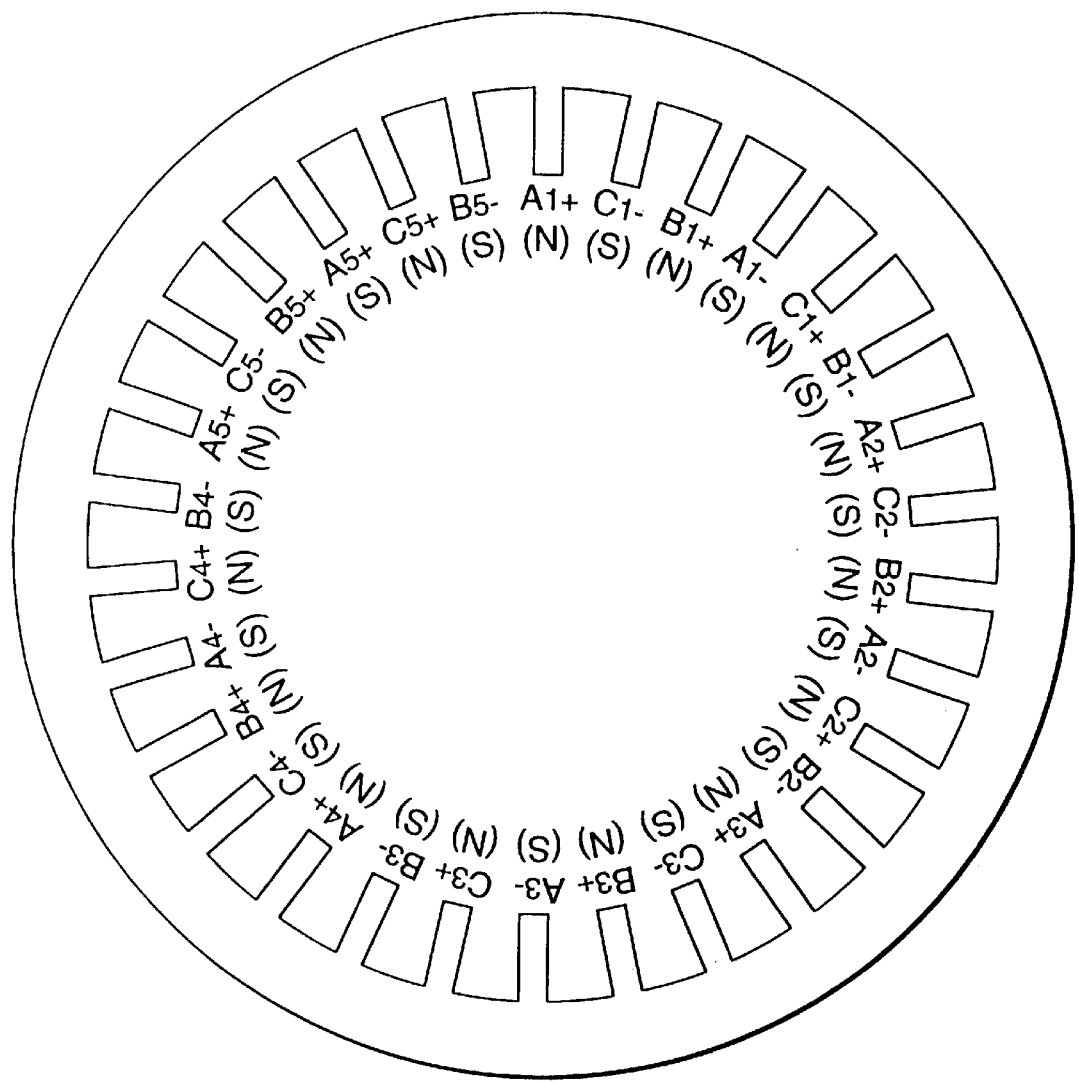
FIG. 19A is a plan view of the lamination of a stator to be combined with the rotor shown in FIG. 18A.
Figure 19B:
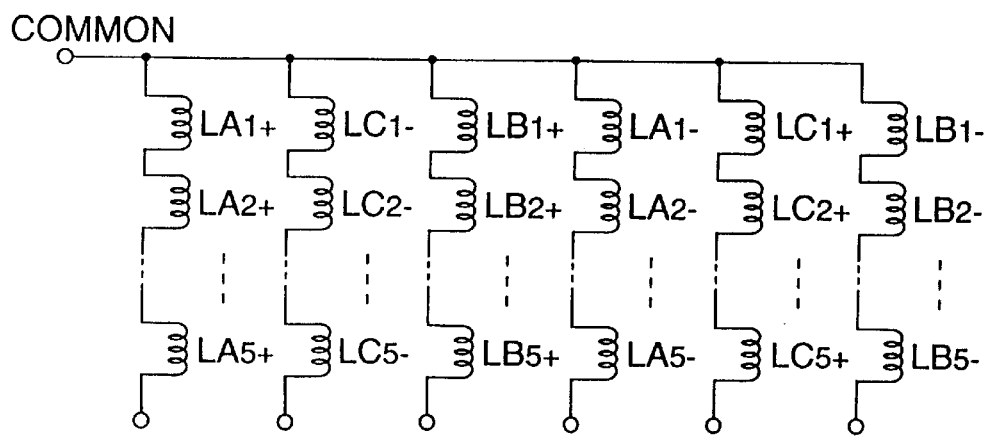
FIG. 19B is a view of excitation windings specifications employed in the present stator.

Now, FIGS. 18 and 19 show a VR-type resolver of an inner rotor type which is a fourth embodiment according to the invention. In particular, FIG. 18A is a schematic plan view of a rotor employed in the present RV-type resolver, FIG. 18B is an enlarged view of the shape of one of teeth formed on the present rotor, FIG. 19A is a plan view of the lamination of a stator employed in the present RV-type resolver, and FIG. 19B is a partial view of the excitation windings specifications employed in the present stator. The VR-type resolver according to the fourth embodiment is different from the VR-type resolver according to the third embodiment in that the teeth of the rotor 111 are formed on the outer peripheral side thereof and the number of the teeth is 25, that is, 1/4 of the number of the rotor of the motor which is 100, and also in that the magnetic poles of the stator 112 are provided on and projected from the inner peripheral surface thereof and the number of the magnetic poles is 30, that is, 6/5 of the number of the teeth of the rotor 111 which is 25.

In the present resolver, as first magnetic poles thereof, $A_{1+}$–$A_{5+}$, $B_{1+}$–$B_{5+}$, and $C_{1+}$–$C_{5+}$ are formed at given intervals in this order; and, at the respective intermediate positions of these first magnetic poles, second magnetic poles $A_{1-}$–$A_{5-}$, $B_{1-}$–$B_{5-}$, and $C_{1-}$–$C_{5-}$ are formed; that is, the respective magnetic poles are arranged in the order of $A_{1+}$–$C_{1-}$–$B_{1+}$–$A_{1-}$–$C_{1+}$–$B_{1-}$–$A_{2+}$–$C_{2-}$- - - . And, excitation windings $LA_{1+}$–$LC_{5-}$ are respectively wound around the magnetic poles $A_{1+}$–$C_{5-}$.

Referring to the arrangement of the excitation windings $LA_{1+}$–$LC_{5-}$ of the respective magnetic poles $A_{1+}$–$C_{5-}$, as shown in FIG. 19B, the excitation windings $LA_{1+}$–$LA_{5+}$, $LB_{1+}$–$LB_{5+}$, $LC_{1+}$–$LC_{5+}$ of the first respective magnetic poles $A_{1+}$–$A_{5+}$, $B_{1+}$–$B_{5+}$, $C_{1+}$–$C_{5+}$ are respectively connected in series; and, in particular, the excitation windings $LA_{1+}$, $LB_{1+}$, $LC_{1+}$ sides thereof are connected to a single-phase a.c. power source, while the excitation windings $LA_{5+}$, $LB_{5+}$, $LC_{5+}$ sides thereof are grounded through resistors. Also, the excitation windings $LA_{1-}$–$LA_{5-}$, $LB_{1-}$–$LB_{5+1}$, $LC_{1-}$–$LC_{5-}$ of the remaining second magnetic poles $A_{1-}$–$A_{5-}$, $B_{1-}$–$B_{5-}$, $C_{1-}$–$C_{5-}$ are respectively connected in series; and, in particular, the excitation windings $LA_{1-}$, $LB_{1-}$, $LC_{1-}$ sides thereof are similarly connected to a single-phase a.c. power source, while the excitation windings $LA_{5-}$, $LB_{5-}$, $LC_{5-}$ sides thereof are grounded through resistors.

The remaining portions of the fourth embodiment are similar to those of the previously described the third embodiment.

Figure 20A:
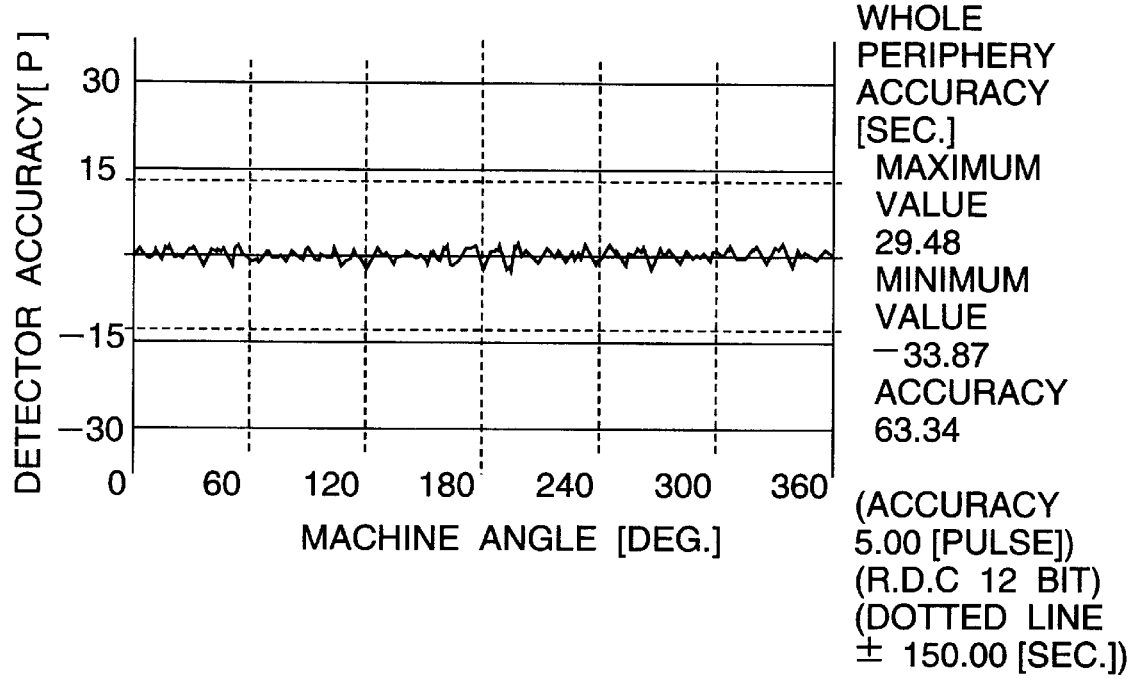
FIGS. 20A and 20B are graphical representations of the relation between the rotor teeth number of a resolver and rotation position measurement accuracy, in particular.
Figure 20B:
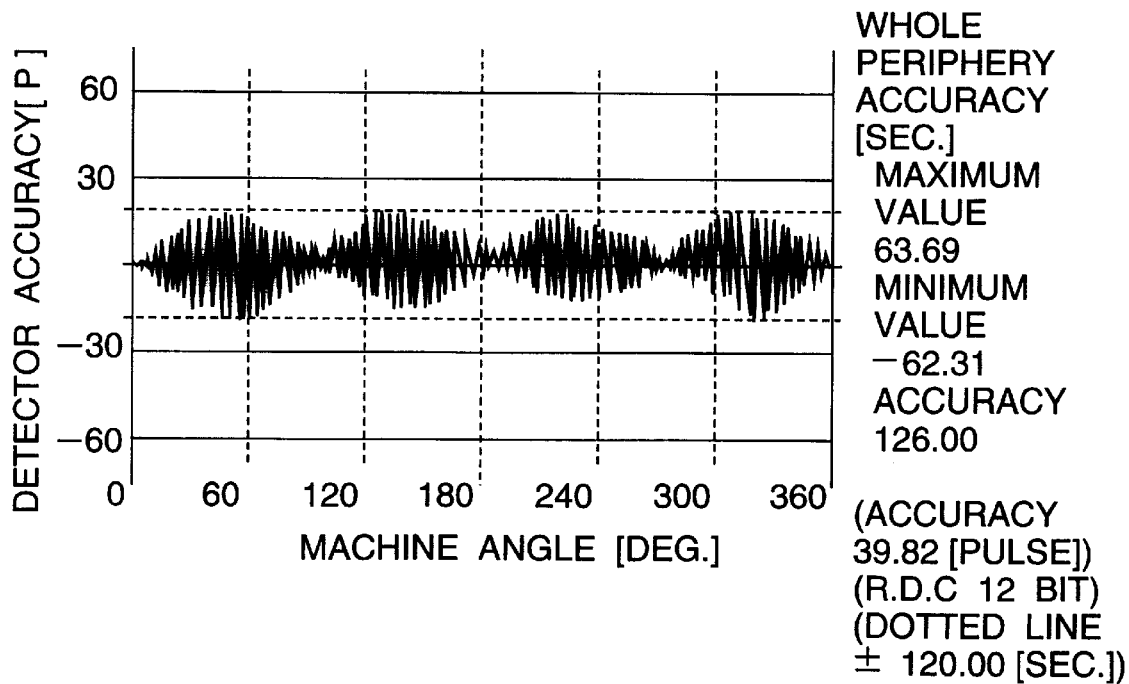
Figure 21:
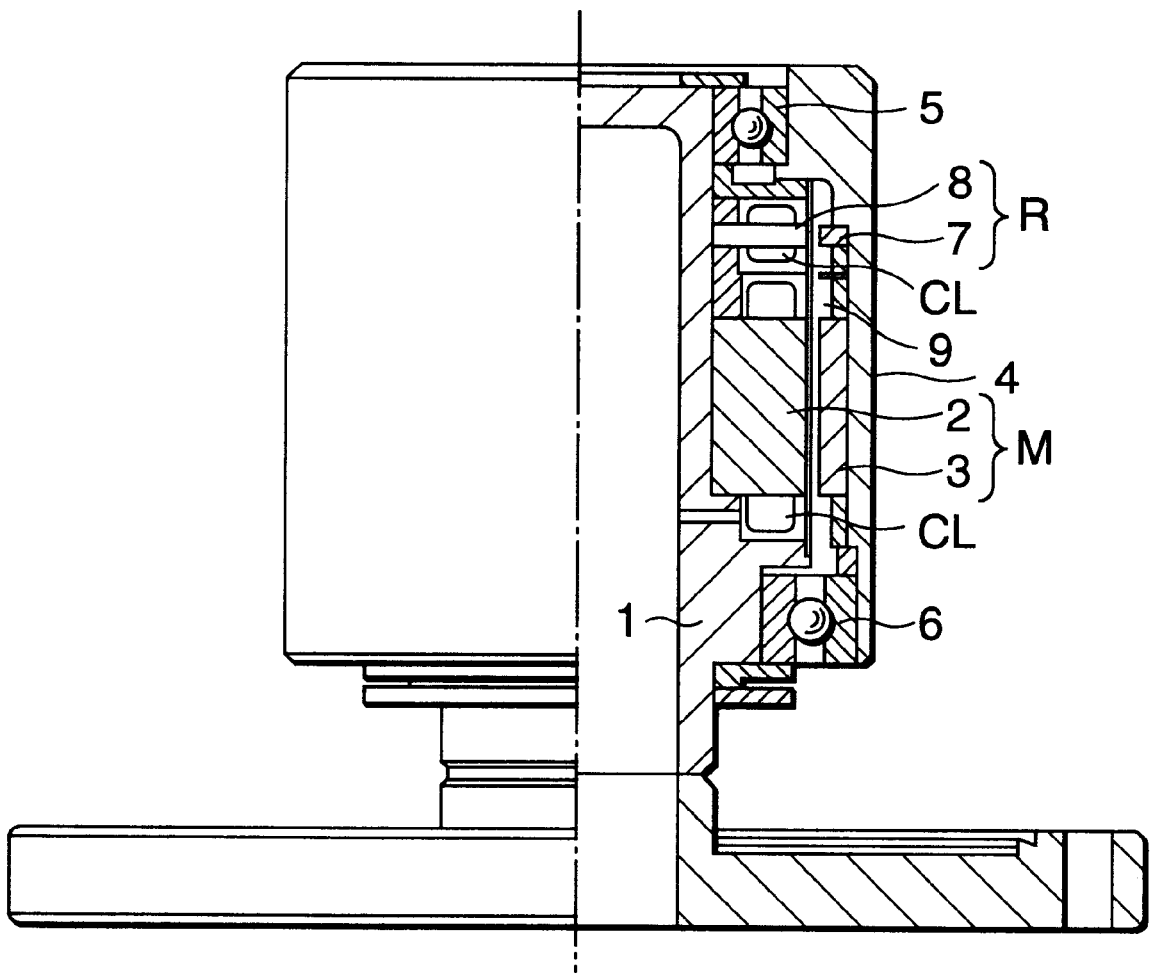
FIG. 21 is a semi-section view of a conventional VR-type resolver, showing a manner how it is used.
Figure 22:
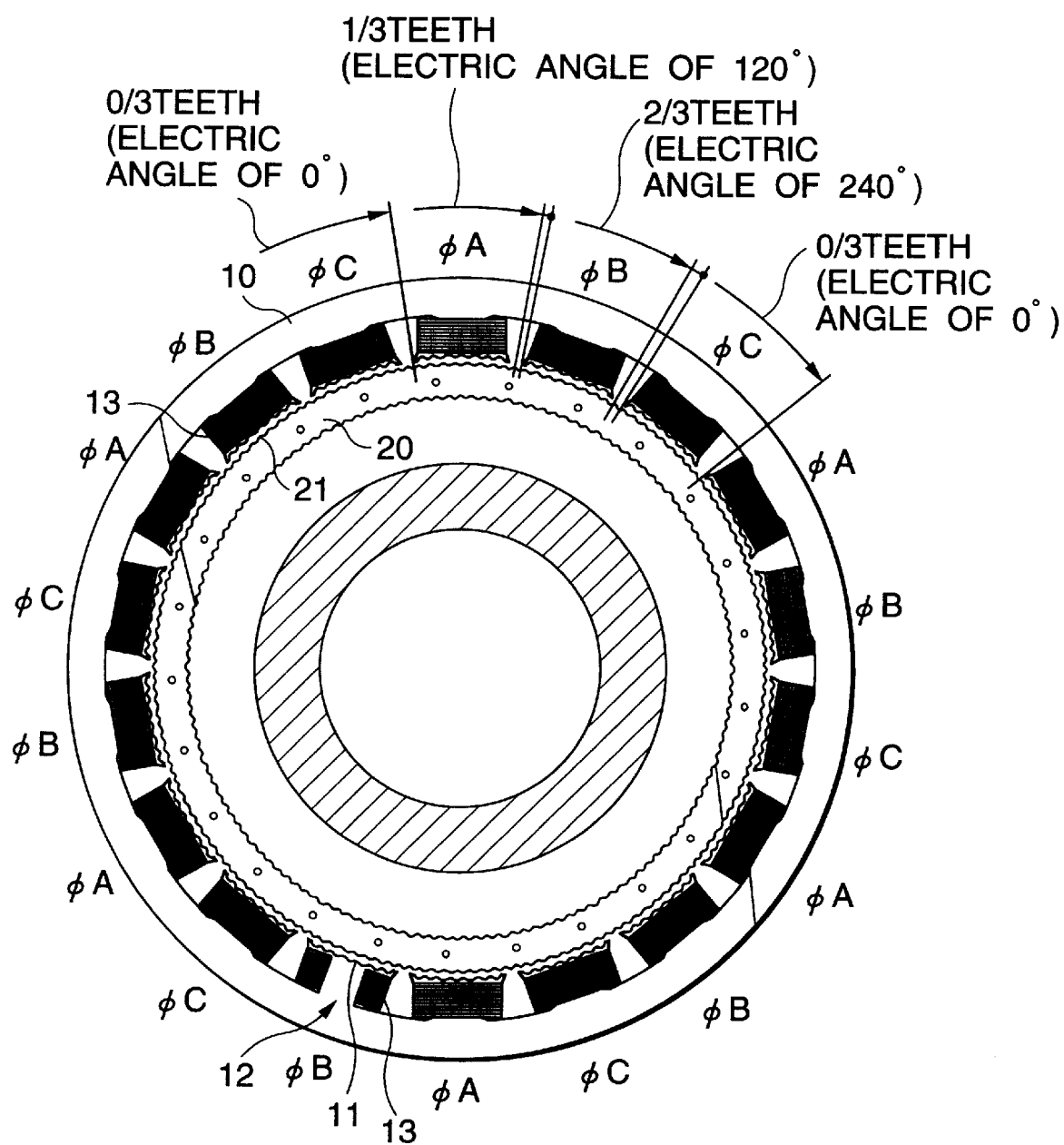
FIG. 22 is a typical view of another conventional VR-type resolver, showing how the rotor and stator of the resolver are combined with each other.
Figure 23:
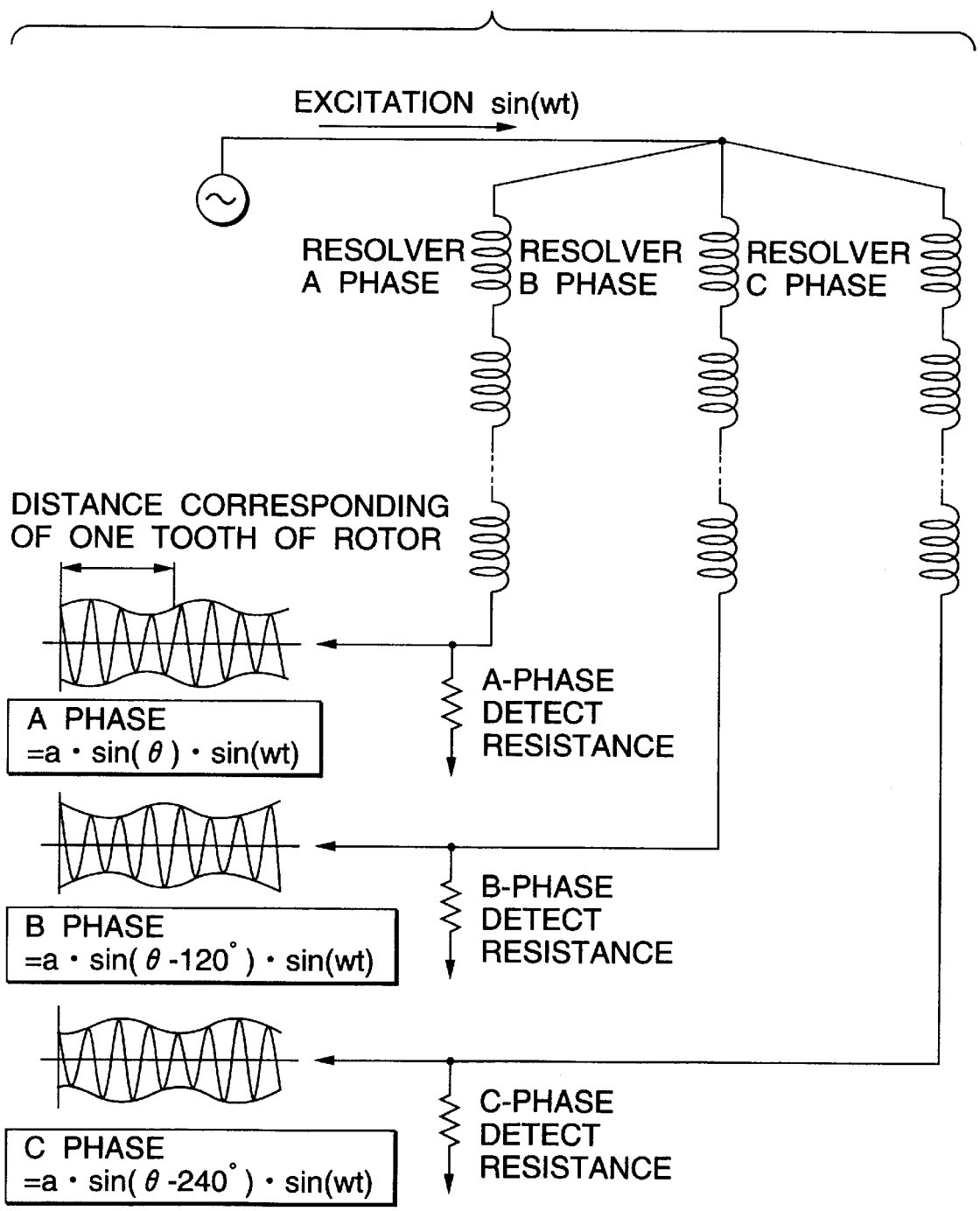
FIG. 23 is a general schematic view of A-, B- and C-phase modulation signals which are allowed to flow in coil windings on a resolver stator when a resolver rotor is rotated.
Figure 24:
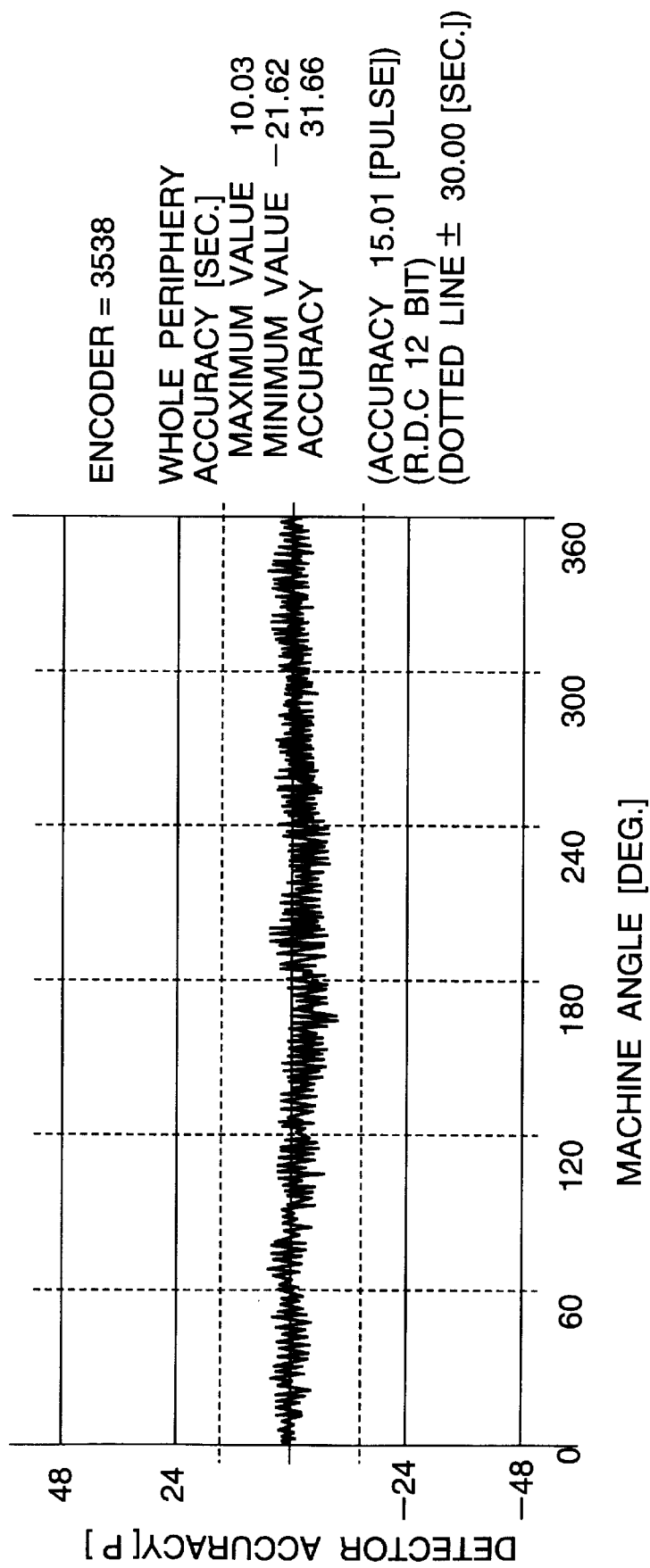
FIG. 24 is a graphical representation of the results of the whole periphery accuracy measurement of a conventional VR-type resolver.

Now, FIG. 20A shows an example of the measured accuracy of a 6-phase differential resolver including a rotor having sine-wave shaped 25 teeth, in which the whole periphery accumulation accuracy is 63.34 sec. On the other hand, FIG. 20B shows an example of the measured accuracy of a conventional 100-teeth resolver, in which the whole periphery accumulation accuracy is 126.00 sec.

The other operations and effects of the fourth embodiment are almost the same as those of the third embodiment. In more particular, as the number of teeth is reduced in the fourth embodiment, the fourth embodiment can provide greater effects.

By the way, although the teeth of the resolver rotor are formed in a sine wave shape in both of the above-mentioned two embodiments of the invention, the teeth shape of the resolver rotor according to the invention is not always limited to the sine wave shape but it can also be formed in a square shape.

Also, the present invention can also apply to other resolvers than the 6-phase differential resolver.

As has been described heretofore, according to the VR-type resolver of the invention, since the teeth number of the rotor of the resolver is reduced when compared with the conventional resolver in which the teeth number of the rotor thereof is set equal to the teeth number of the motor, the whole periphery accumulation accuracy of the rotation position detection caused by the accumulation of the teeth pitch errors can be enhanced over that of the conventional resolver.

Also, in view of the fact that the vibration frequency of a resolver is generated in proportion to the rotor teeth number thereof, due to the reduced rotor teeth number, the vibration frequency of the present resolver can be lowered, which can provide an effect that the vibration of the resolver can be lowered.

Further, when compared with the conventional resolver, there can be provided a wider air gap between the rotor and stator of the resolver. As a result of this, it is possible to manufacture a resolver having a smaller diameter and thus the resolver can be made compact easily. Moreover, using the wider air gap, the thickness of the shutoff separation wall of the resolver for vacuum can be increased over that of the conventional resolver, which can provide an effect that there can be supplied a resolver for vacuum capable of standing a higher level of vacuum (in particular, ultra-high vacuum).

By the way, the reduction in the resolving power of the resolver, which is caused by reducing the teeth number of the rotor of the resolver down to 1/n of the teeth number of the rotor of the motor, can be compensated by multiplying the output signal of the stator of the resolver by n when the output signal is processed by the counter in the control circuit.

In a VR-type resolver according to the invention, the teeth shape of the rotor of the resolver, which is conventionally limited to a square shape identical with the teeth shape of the rotor of a motor, is simplified into a curved shape, especially, into a sine wave shape, thereby being able to provide an effect that the manufacturing process of the resolver including design, working, assembling, and other steps can be simplified.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A VR-type resolver comprising:

an annular-shaped stator fixedly supported, said stator including a plurality of magnetic poles formed at regular intervals on a circumference thereof, each of said magnetic poles having a plurality of pole teeth in their respective leading end portions, said magnetic poles having N phases of coils respectively wound phase by phase in series therearound; and an annular-shaped rotor disposed concentrically with said stator and rotatable with respect to said stator, said rotor including teeth respectively formed in a circumferential direction thereof so that they are opposed to said pole teeth of said stator, wherein the number of said magnetic poles of said stator with respect to the number of said teeth of said rotor is set (i) so as to be a multiple of said phase number N and an even number, and (ii) satisfy one of the following expressions (1) and (2):

$$\text{stator pole number} = \text{rotor teeth number}/(M+1/N) \quad (1)$$

$$\text{stator pole number} = \text{rotor teeth number}/\{M+(N-1)/N\} \quad (2),$$

where M is an integral number of one of 1, 2 and 3.

2. A VR-type resolver for use in combination with a motor to detect a rotation position of the motor, said VR-type resolver comprising:

a resolver rotor having a plurality of teeth; and a resolver stator having a plurality of magnetic poles, said resolver stator being disposed so as to be opposed to said resolver rotor at circumferences thereof with each other, wherein the number of said teeth formed on said resolver rotor is set smaller than the number of teeth of a rotor of the motor.

3. A VR-type resolver according to claim 2, wherein each of said teeth of said resolver rotor is shaped in a curved shape.

4. A VR-type resolver according to claim 3, wherein each of said teeth of said resolver rotor is shaped in a sine wave shape.

5. A VR-type resolver according to claim 2, wherein the number of said teeth formed on said resolver rotor is substantially one quarter of the number of teeth of the rotor of the motor.

* * * * *